United States Patent
Hecht et al.

(10) Patent No.: US 9,999,927 B2
(45) Date of Patent: Jun. 19, 2018

(54) PARTING-OFF TOOL ASSEMBLY WITH SINGLE-CUTTING-EDGED SOLID CUTTING INSERT AND RIGID-INSERT-SEAT TOOL

(71) Applicant: Iscar, Ltd., Tefen (IL)

(72) Inventors: Gil Hecht, Nahariya (IL); Dima Makhlin, Nesher (IL); Sergey Chistyakov, Nahariya (IL)

(73) Assignee: Iscar, Ltd., Tefen (IL)

( * ) Notice: Subject to any disclaimer, the term of this patent is extended or adjusted under 35 U.S.C. 154(b) by 304 days.

(21) Appl. No.: 14/953,584

(22) Filed: Nov. 30, 2015

(65) Prior Publication Data

US 2017/0151612 A1  Jun. 1, 2017

(51) Int. Cl.
| | | |
|---|---|---|
| *B23B 29/04* | (2006.01) | |
| *B23B 27/16* | (2006.01) | |
| *B23C 5/22* | (2006.01) | |
| *B23B 27/04* | (2006.01) | |

(52) U.S. Cl.
CPC .......... *B23B 27/04* (2013.01); *B23B 27/1625* (2013.01); *B23B 29/043* (2013.01); *B23B 2205/02* (2013.01); *B23B 2205/12* (2013.01)

(58) Field of Classification Search
CPC . B23B 27/04; B23B 2205/12; B23B 27/1625; B23B 27/164; B23B 29/043; B23B 2205/02; B23B 2205/04
See application file for complete search history.

(56) References Cited

U.S. PATENT DOCUMENTS

| | | | | |
|---|---|---|---|---|
| 80,929 A | * | 8/1868 | Disston | D23B 29/043 83/845 |
| 195,699 A | * | 10/1877 | Burger | B23D 61/06 76/80 |
| 1,184,368 A | * | 5/1916 | Morgal | B23C 5/22 144/230 |
| 1,239,459 A | | 9/1917 | Carew | |
| 1,240,699 A | * | 9/1917 | Frey et al. | B23B 27/04 407/106 |
| 1,608,182 A | * | 11/1926 | Pospiech | B23D 61/06 83/841 |
| 3,551,975 A | * | 1/1971 | Novkov | B23B 27/04 407/117 |
| 3,775,817 A | * | 12/1973 | Hertel | B23B 27/1629 407/5 |
| 3,980,443 A | | 9/1976 | McCreery | |

(Continued)

FOREIGN PATENT DOCUMENTS

| | | | |
|---|---|---|---|
| DE | 2647546 A1 * | 4/1978 | ............ B23B 27/04 |
| EP | 1591179 A2 * | 11/2005 | ............ B23B 27/04 |

OTHER PUBLICATIONS

International Search Report dated Jan. 19, 2017, issued in PCT counterpart application (No. PCT/IL2016/051191).

(Continued)

*Primary Examiner* — Sara Addisu
(74) *Attorney, Agent, or Firm* — Womble Bond Dickinson (US) LLP

(57) ABSTRACT

A tool assembly for heavy duty machining includes an insert, tool and clamp for securing the insert to a rigid insert seat of the tool. The insert is a solid cutting insert including a single cutting edge located at a corner region thereof. At a diagonally opposed corner region the insert is not subjected to clamping forces.

21 Claims, 6 Drawing Sheets

(56) References Cited

U.S. PATENT DOCUMENTS

| | | | | |
|---|---|---|---|---|
| 4,035,887 A | * | 7/1977 | Hertel | B23B 27/16 407/107 |
| 4,169,690 A | * | 10/1979 | Kendra | B23B 27/065 407/103 |
| 4,417,833 A | * | 11/1983 | Wertheimer | B23C 5/006 407/61 |
| 4,443,136 A | * | 4/1984 | Kemmer | B23B 27/083 407/110 |
| 4,462,725 A | * | 7/1984 | Satran | B23B 27/04 407/108 |
| 4,509,886 A | * | 4/1985 | Lindsay | B23B 27/04 407/102 |
| 4,611,516 A | * | 9/1986 | Hochmuth | B23B 27/16 407/112 |
| 4,744,278 A | * | 5/1988 | Wright | B23C 5/22 144/218 |
| 4,946,319 A | * | 8/1990 | Lyon | B23B 27/045 407/115 |
| 5,150,992 A | * | 9/1992 | Friedmann | B23B 27/045 407/110 |
| 5,308,197 A | * | 5/1994 | Little | B23B 27/065 407/101 |
| 5,360,298 A | * | 11/1994 | Hedlund | B23B 27/045 407/110 |
| 5,411,354 A | * | 5/1995 | Gustafsson | B23B 27/045 407/104 |
| 5,439,327 A | * | 8/1995 | Wertheim | B23B 27/045 407/11 |
| 5,469,902 A | * | 11/1995 | Sharp | B27G 13/10 144/176 |
| 5,775,854 A | * | 7/1998 | Wertheim | B23B 27/04 407/11 |
| 5,829,924 A | * | 11/1998 | Oshnock | B23B 27/045 407/110 |
| 5,947,648 A | * | 9/1999 | Friedman | B23B 27/045 407/107 |
| 6,116,823 A | * | 9/2000 | Mihic | B23C 5/08 407/109 |
| 6,758,638 B1 | * | 7/2004 | Mihic | B23B 27/04 407/107 |
| 7,163,361 B2 | * | 1/2007 | Hecht | B23B 29/043 407/109 |
| 7,326,007 B2 | | 2/2008 | Hecht | |
| 7,331,096 B2 | * | 2/2008 | Kugler | B23B 27/04 29/426.5 |
| 7,384,218 B2 | * | 6/2008 | Nagaya | B23B 27/04 407/110 |
| 7,578,640 B2 | | 8/2009 | Hecht | |
| 8,678,718 B2 | * | 3/2014 | Hecht | B23B 27/1614 407/104 |
| 8,708,610 B2 | | 4/2014 | Hecht | |
| 9,033,621 B2 | | 5/2015 | Hecht | |
| 9,050,658 B2 | * | 6/2015 | Hecht | B23B 27/04 |
| 2002/0081165 A1 | * | 6/2002 | Hecht | B23C 5/08 407/110 |
| 2002/0176754 A1 | * | 11/2002 | Barazani | B23B 27/04 407/42 |
| 2003/0156910 A1 | * | 8/2003 | Friedman | B23B 27/08 407/117 |
| 2003/0165362 A1 | * | 9/2003 | Hecht | B23B 27/08 407/107 |
| 2005/0232712 A1 | | 10/2005 | Hecht | |
| 2005/0238444 A1 | * | 10/2005 | Virtanen | B23B 27/04 407/110 |
| 2007/0009334 A1 | * | 1/2007 | Edler | B23B 27/1625 407/107 |
| 2008/0080937 A1 | | 4/2008 | Hecht | |
| 2009/0035076 A1 | * | 2/2009 | Hecht | B23B 27/045 407/113 |
| 2013/0071194 A1 | | 3/2013 | Hecht | |
| 2013/0167345 A1 | * | 7/2013 | Hecht | B23B 29/04 29/267 |
| 2013/0266384 A1 | * | 10/2013 | Hecht | B23B 27/007 407/100 |
| 2014/0321929 A1 | * | 10/2014 | Bhagath | B23B 27/045 407/109 |
| 2015/0086282 A1 | * | 3/2015 | Zeeb | B23B 27/04 407/34 |
| 2015/0117971 A1 | * | 4/2015 | Eisen | B23C 5/08 407/49 |
| 2015/0246397 A1 | * | 9/2015 | Voege | B23B 29/043 407/66 |
| 2017/0136549 A1 | * | 5/2017 | Athad | B23B 27/145 |
| 2017/0151612 A1 | * | 6/2017 | Hecht | B23B 27/04 |

OTHER PUBLICATIONS

Written Opinion dated Jan. 19, 2017, issued in PCT counterpart application (No. PCT/IL2016/051191).

* cited by examiner

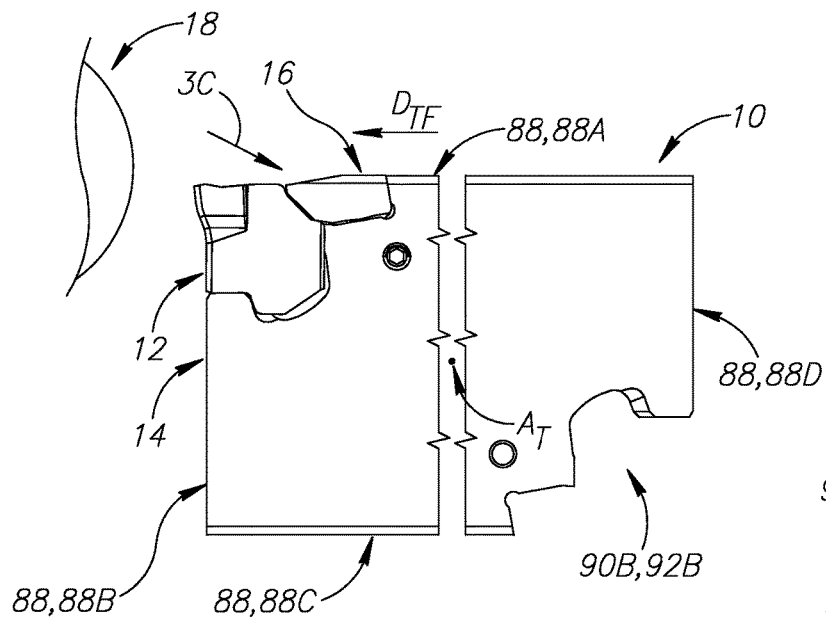
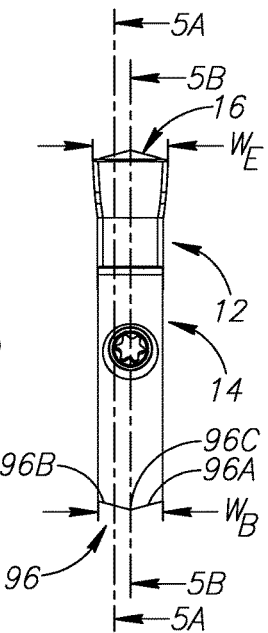
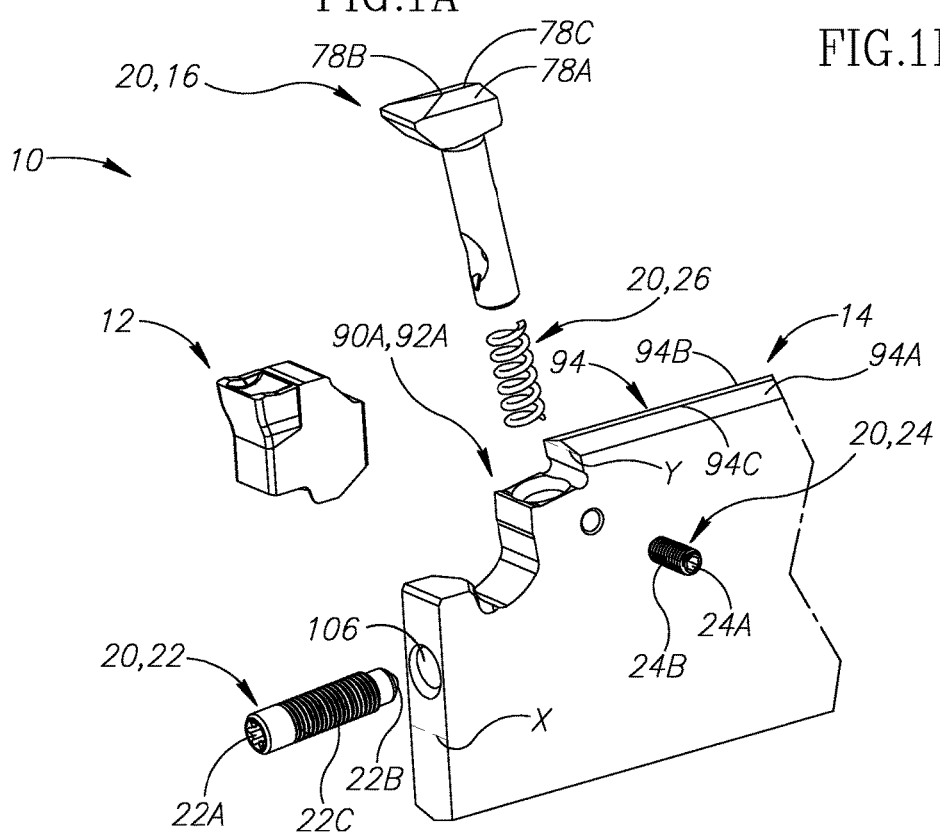
FIG.1A
FIG.1B
FIG.1C

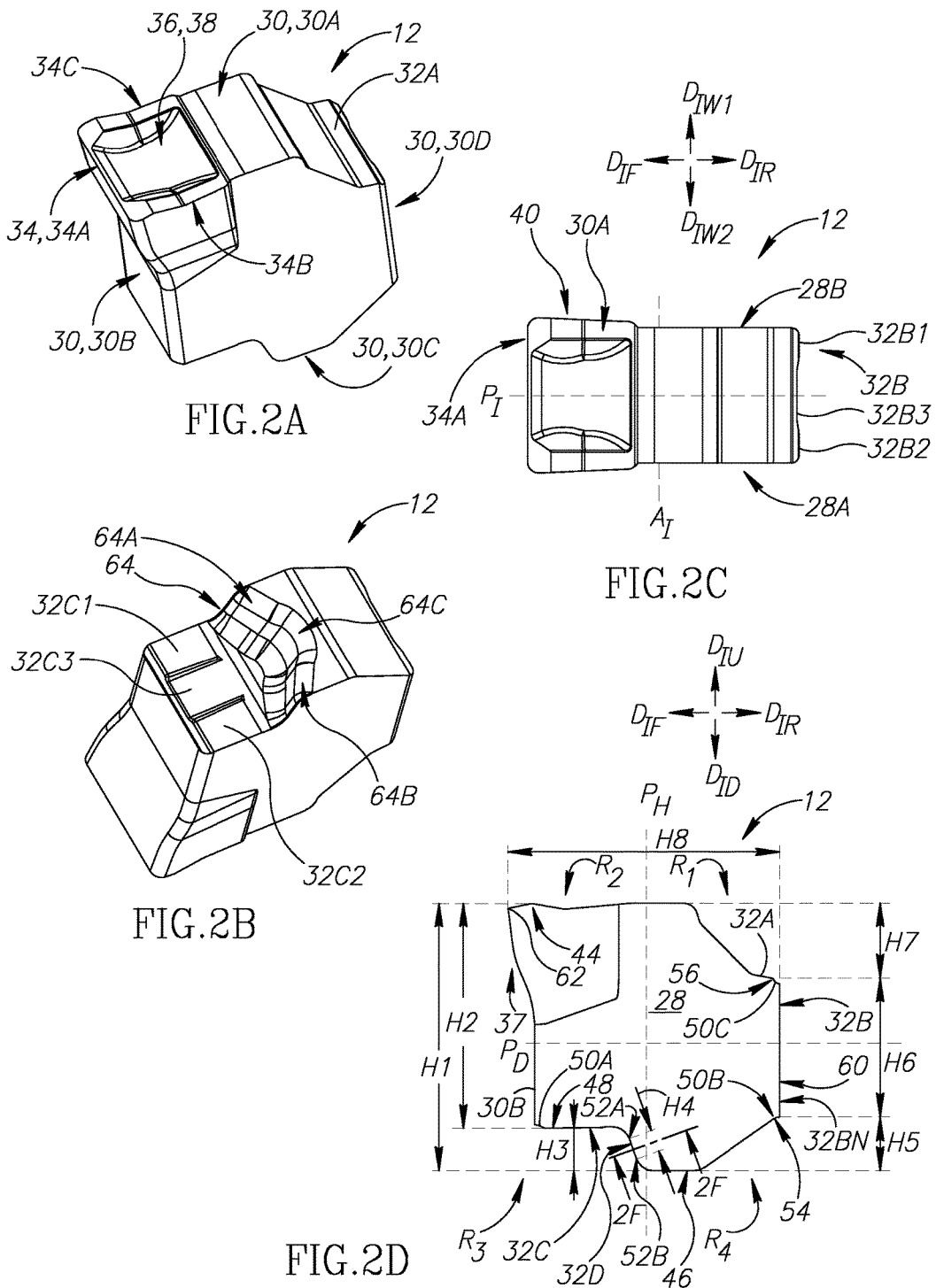

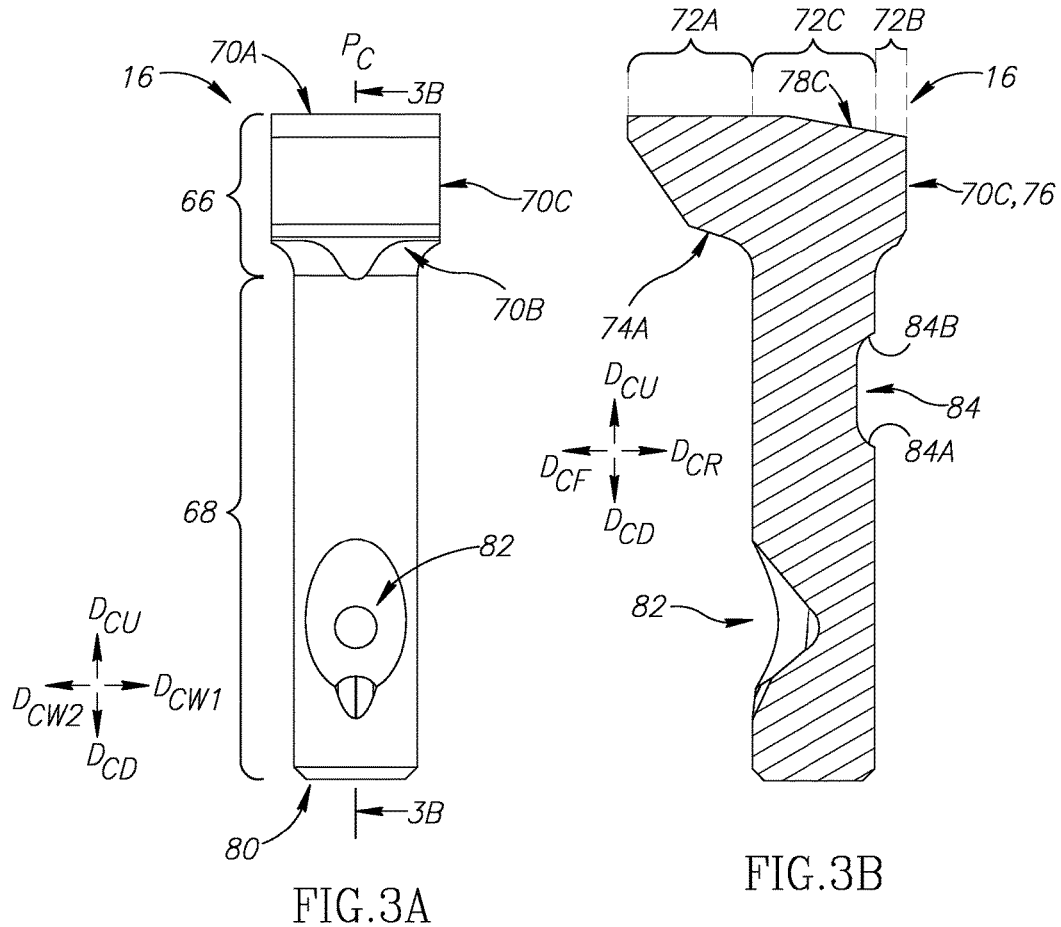
FIG.3A
FIG.3B
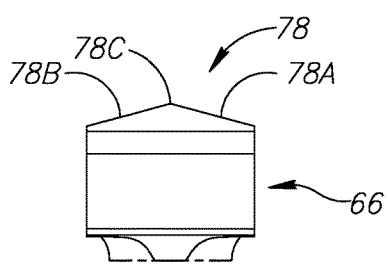
FIG.3C

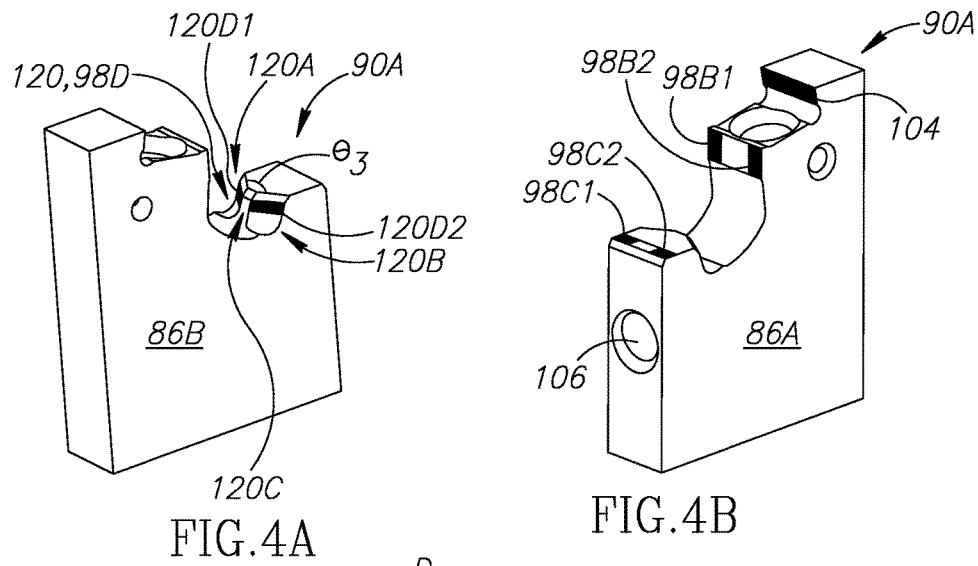
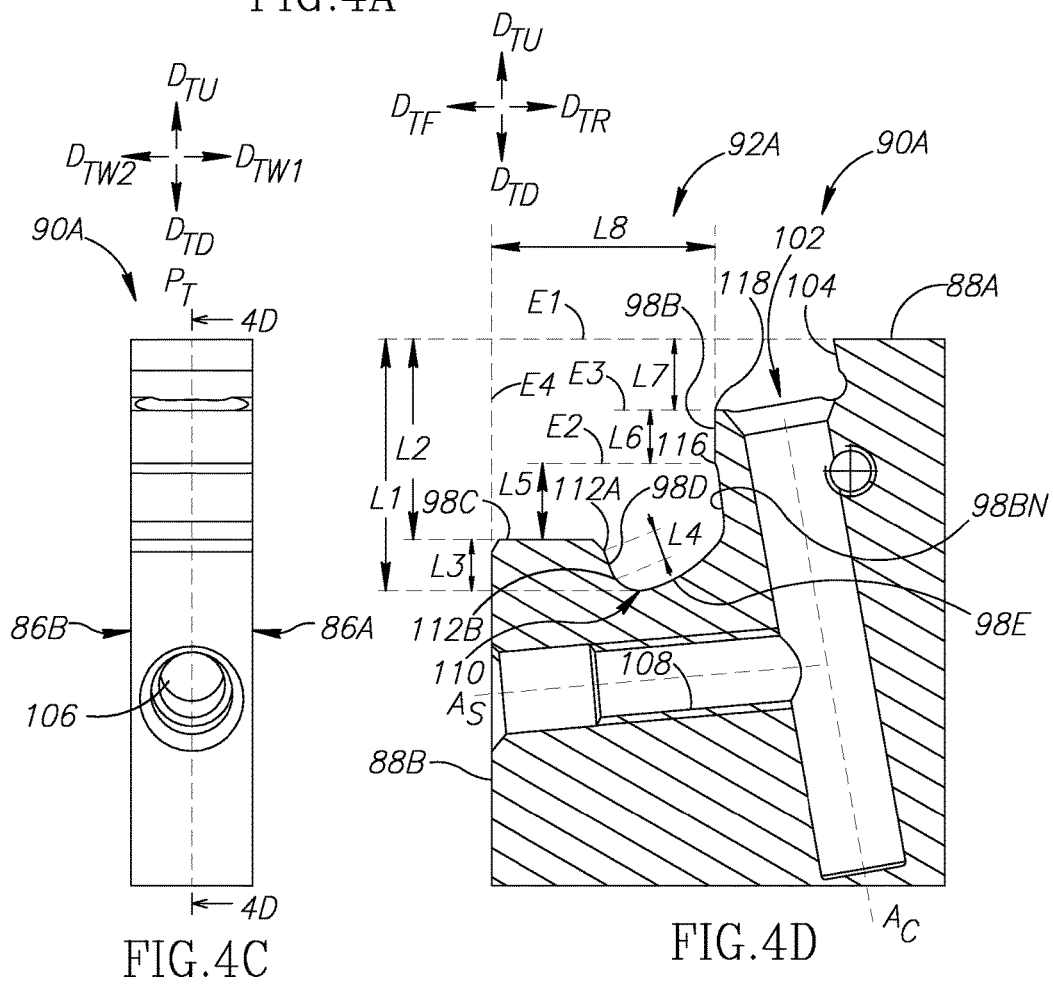
FIG.4A
FIG.4B
FIG.4C
FIG.4D

PARTING-OFF TOOL ASSEMBLY WITH SINGLE-CUTTING-EDGED SOLID CUTTING INSERT AND RIGID-INSERT-SEAT TOOL

FIELD OF THE INVENTION

The subject matter of the present application relates to tool assembly, particularly for heavy duty parting-off applications, comprising a solid cutting insert having a single cutting edge, a tool, and a clamp for securing the insert to a rigid insert seat of the tool.

BACKGROUND OF THE INVENTION

Cutting inserts were traditionally held to rigid insert seats with a clamp. A clamp according to the specification and claims meaning a member having a head and a shank of either a threaded type, e.g. a screw, or a non-threaded type, e.g. a pin. An example of a clamp with a non-threaded shank is disclosed in U.S. Pat. No. 9,033,621, assigned to the present applicant.

It was discovered that, particularly for parting-off, an improved design without the need for a clamp was feasible (e.g. the assembly disclosed in U.S. Pat. No. 7,326,007, assigned to the present applicant). In such design, instead of utilizing a clamp, a single-cutting-edged solid insert ("single-cutting-edged" or stated differently "non-indexable"; "solid" or stated differently "devoid of a clamping hole") is resiliently retained to a seat of tool by elasticity of opposing portions of the insert seat. A notable advantage of such clamp-less design is the relatively narrow machining width enabled, since the insert and the tool widths do not need to accommodate a clamp.

Yet a further design utilizing a single-cutting-edged solid insert, but with a dual resilient insert seat and clamp (called a "threaded fastener" therein), is shown in U.S. Pat. No. 7,578,640, also assigned to the present applicant. On the one hand, the construction is more complicated due to the presence of the additional component, i.e. the clamp, on the other since the resilient seat also clamps the insert a relatively narrow clamp can be utilized, thereby retaining at least some of the relatively narrow machining width benefit.

SUMMARY OF THE INVENTION

In accordance with a first aspect of the subject matter of the present application, there is provided a tool assembly comprising: an insert, tool and clamp configured to secure the insert to the tool; the insert being circumferentially divisible into first, second, third and fourth corner regions, and comprising: a first corner region comprising: an insert upper abutment surface formed at a peripheral upper sub-surface and extending forward of a peripheral rear sub-surface; and an insert rear abutment surface formed at the peripheral rear sub-surface and extending downward of the peripheral upper sub-surface; a second corner region comprising: a cutting edge connecting the insert side surfaces and being wider than adjacent portions of the peripheral upper surface and a peripheral front sub-surface; a third corner region comprising: an insert first lower abutment surface formed at a peripheral lower sub-surface and extending rearward of the peripheral front sub-surface; an insert second lower abutment surface formed at the peripheral lower sub-surface and extending downward of the insert first lower abutment surface; the tool comprising: a rigid insert seat along a tool peripheral surface; the insert seat comprising: a rearwardly extending tool first lower abutment surface; a tool second lower abutment surface extending downward of the tool first lower abutment surface; a downwardly extending tool rear abutment surface; and a tool relief sub-surface extending between the tool second lower abutment surface and the tool rear abutment surface; the clamp comprising: a shank; and a clamp head extending from the shank and comprising a clamp-insert abutment surface; wherein, the insert is clamped to the tool by the following abutment configuration: the clamp-insert abutment surface abutting the insert upper abutment surface; the tool first lower abutment surface abutting the insert first lower abutment surface; the tool second lower abutment surface abutting the insert second lower abutment surface; and the tool rear abutment surface abutting the insert rear abutment surface.

In accordance with a second aspect of the subject matter of the present application, there is provided a tool assembly comprising, in combination: an insert, tool and clamp configured to secure the insert to the tool; the insert comprising: opposite insert first and second side surfaces; an insert plane parallel with and located midway between the insert side surfaces; an insert peripheral surface connecting the insert side surfaces; a first corner region located in an upper-rear portion of the cutting insert; a second corner region located in an upper-front portion of the cutting insert; a third corner region located in an lower-front portion of the cutting insert; and a fourth corner region located in an lower-rear portion of the cutting insert; the insert peripheral surface comprising: a peripheral upper sub-surface extending from the first corner region to the second corner region; a peripheral front sub-surface extending from the second corner region to the third corner region; a peripheral lower sub-surface extending from the third corner region to the fourth corner region; and a peripheral rear sub-surface extending from the fourth corner region to the first corner region; the first corner region comprising: an insert upper abutment surface formed at the peripheral upper sub-surface and extending forward of the peripheral rear sub-surface; and an insert rear abutment surface formed at the peripheral rear sub-surface and extending downward of the peripheral upper sub-surface; the second corner region comprising: a cutting edge connecting the insert side surfaces and being wider than adjacent portions of the peripheral upper and front sub-surfaces; the third corner region comprising: an insert first lower abutment surface formed at the peripheral lower sub-surface and extending rearward of the peripheral front sub-surface; and an insert second lower abutment surface formed at the peripheral lower sub-surface and extending downward of the insert first lower abutment surface; the tool comprising a tool corner which in turn comprises: opposite tool first and second side surfaces; a tool plane parallel with and located midway between the tool side surfaces; a tool peripheral surface connecting the tool side surfaces; and a rigid insert seat formed at an intersection of the tool peripheral surface and tool first and second side surfaces; the tool peripheral surface at the tool corner further comprising: a tool upper sub-surface extending rearward of the insert seat; and a tool front sub-surface extending downward of the insert seat; the insert seat, along the tool peripheral surface, comprising: a tool first lower abutment surface extending rearward of the tool front sub-surface; a tool second lower abutment surface extending downward of the tool first lower abutment surface; a tool rear abutment surface extending downward of the tool upper sub-surface; and a tool relief sub-surface extending between the tool second lower abutment surface and the tool rear abutment surface; the clamp comprising: a shank; and a clamp head extending from the shank and comprising a clamp-insert abutment surface; wherein the insert is clamped to the tool by the following abutment configuration: the clamp-insert abutment surface abutting the insert upper abutment surface; the tool first lower abutment surface abutting the insert first lower abutment surface; the tool second lower abutment surface abutting the insert second lower abutment surface; and the tool rear abutment surface abutting the insert rear abutment surface.

In accordance with a third aspect of the subject matter of the present application, there is provided a tool assembly comprising, in combination: an insert, a tool, and a clamp configured to secure the insert to the tool; the insert comprising: opposite insert first and second side surfaces; an insert plane parallel with and located midway between the insert side surfaces; an insert peripheral surface connecting the insert side surfaces; a first corner region located in an upper-rear portion of the cutting insert; a second corner region located in an upper-front portion of the cutting insert; a third corner region located in an lower-front portion of the cutting insert; and a fourth corner region located in an lower-rear portion of the cutting insert; the insert peripheral surface comprising: a peripheral upper sub-surface extending from the first corner region to the second corner region; a peripheral front sub-surface extending from the second corner region to the third corner region; a peripheral lower sub-surface extending from the third corner region to the fourth corner region; and a peripheral rear sub-surface extending from the fourth corner region to the first corner region; the first corner region comprising: an insert upper abutment surface formed at the peripheral upper sub-surface and extending forward of the peripheral rear sub-surface; and an insert rear abutment surface formed at the peripheral rear sub-surface and extending downward of the peripheral upper sub-surface; the second corner region comprising: a cutting edge connecting the insert side surfaces and being wider than adjacent portions of the peripheral upper and front sub-surfaces; the third corner region comprising: an insert first lower abutment surface formed at the peripheral lower sub-surface and extending rearward of the peripheral front sub-surface; and an insert second lower abutment surface formed at the peripheral lower sub-surface and extending downward of the insert first lower abutment surface; the tool comprising a tool corner which in turn comprises: opposite tool first and second side surfaces; a tool plane parallel with and located midway between the tool side surfaces; a tool peripheral surface connecting the tool side surfaces; and a rigid insert seat formed at an intersection of the tool peripheral surface and tool first and second side surfaces; the tool peripheral surface at the tool corner further comprising: a tool upper sub-surface extending rearward of the insert seat; and a tool front sub-surface extending downward of the insert seat; the insert seat, along the tool peripheral surface, comprising: a tool first lower abutment surface extending rearward of the tool front sub-surface; a tool second lower abutment surface extending downward of the tool first lower abutment surface; a tool rear abutment surface extending downward of the tool upper sub-surface; and a tool relief sub-surface extending between the tool second lower abutment surface and the tool rear abutment surface; the clamp comprising: a shank; and a clamp head extending from the shank and comprising a clamp-insert abutment surface; wherein, the insert is clamped to the tool by the following abutment configuration: the clamp-insert abutment surface abutting the insert upper abutment surface; the tool first lower abutment surface abutting the insert first lower abutment surface; the tool second lower abutment surface abutting the insert second lower abutment surface; and the tool rear abutment surface abutting the insert rear abutment surface; wherein: the insert's fourth corner region comprises a rearwardly facing insert rear non-abutment surface which is located adjacent to and below the insert rear abutment surface; the tool relief sub-surface comprising a forwardly facing tool rear non-abutment surface which is located adjacent to and below the tool rear abutment surface; a rear relief gap separates the insert rear non-abutment surface and the tool rear non-abutment surface.

In accordance with a fourth aspect of the subject matter of the present application, there is provided a tool assembly comprising an insert, tool and clamp according to any of the aspects below.

Heavy duty machining is characterized by particularly high machining forces, accordingly, each of the following features, alone or in combination with any one of the above aspects, can improve performance of a tool assembly during heavy duty machining:

A clamping force $F_1$ caused by the clamp-insert abutment surface abutting the insert upper abutment surface can be directed in a downward direction which is rearward of the insert's peripheral front sub-surface. Without being bound to theory, it is believed directing said clamping force towards the insert's peripheral front sub-surface can cause instability of the insert.

A clamping force $F_3$ caused by the tool second lower abutment surface abutting the insert second lower abutment surface can be directed in a rearward direction which is lower than the location towards a region below where the tool rear abutment surface abuts the insert rear abutment surface. Stated differently, the insert second lower abutment surface is directed in a rearward direction towards a region below where the tool rear abutment surface abuts the insert rear abutment surface. Without being bound to theory, it is believed that if said clamping force would be directed to another abutment point, a resilient-like mounting arrangement would be achieved. Such resilient mounting being detrimental to longevity of the tool, since elastic components can be worn relatively quickly down during heavy duty machining. Such arrangement is also believed to provide a superior force-arrangement for stability of the insert when mounted. A way to achieve this is by providing a rear relief gap at said location.

An insert in a mounted-unclamped position in the insert seat can be freely removable (i.e. not resiliently mounted). For heavy duty machining the perceived benefit of the present arrangement (e.g. such as longevity of the tool, superior stability) is believed to outweigh benefits of resilient mounting.

The clamp can merely ensures that the insert remains in a desired position, but the arrangement described ensures that cutting forces are applied to the tool alone and not the clamp.

To summarize the above, as will be understood, each of the features above can, individually and in combination, contribute to an insert mounting arrangement which is superior for heavy duty machining. Summarized differently, the features above result in the machining forces on the insert are applied to the tool and not the clamp, the clamp force application direction providing increased insert stability, the lack of opposing tool abutment areas providing insert stability and also increases tool longevity.

Generally speaking, in the specification and claims, where it is stated that the insert is clamped by an "abutment configuration" it should be understood that additional abutments are excluded.

It will be understood that an insert, according to any of the aspects, is configured to be held in a mounted position in an insert seat by having a clamping force simultaneously applied on, and only on, the insert upper abutment surface, the insert first lower abutment surface; the insert second lower abutment surface, and the insert rear abutment surface.

In accordance with a fifth aspect of the subject matter of the present application, there is provided an insert being circumferentially divisible into first, second, third and fourth corner regions; the first corner region comprising: an insert upper abutment surface formed at a peripheral upper sub-surface and extending forward of a peripheral rear sub-surface; and an insert rear abutment surface formed at the peripheral rear sub-surface and extending downward of the peripheral upper sub-surface; the second corner region comprising: a cutting edge connecting the insert side surfaces and being wider than adjacent portions of the peripheral upper surface and a peripheral front sub-surface; the third corner region comprising: an insert first lower abutment surface formed at a peripheral lower sub-surface and extending rearward of the peripheral front sub-surface; and an insert second lower abutment surface formed at the peripheral lower sub-surface and extending downward of the insert first lower abutment surface.

In accordance with a sixth aspect of the subject matter of the present application, there is provided a single-cutting-edged solid cutting insert comprising: opposite insert first and second side surfaces; an insert plane parallel with and located midway between the insert side surfaces; an insert peripheral surface connecting the insert side surfaces; a first corner region located in an upper-rear portion of the cutting insert; a second corner region located in an upper-front portion of the cutting insert; a third corner region located in an lower-front portion of the cutting insert; and a fourth corner region located in an lower-rear portion of the cutting insert; the insert peripheral surface comprising: a peripheral upper sub-surface extending from the first corner region to the second corner region; a peripheral front sub-surface extending from the second corner region to the third corner region; a peripheral lower sub-surface extending from the third corner region to the fourth corner region; and a peripheral rear sub-surface extending from the fourth corner region to the first corner region; the first corner region comprising: an insert upper abutment surface formed at the peripheral upper sub-surface and extending forward of the peripheral rear sub-surface; and an insert rear abutment surface formed at the peripheral rear sub-surface and extending downward of the peripheral upper sub-surface; the second corner region comprising: a cutting edge connecting the insert side surfaces and being wider than adjacent portions of the peripheral upper and front sub-surfaces; the third corner comprising: an insert first lower abutment surface formed at the peripheral lower sub-surface and extending rearward of the peripheral front sub-surface; and an insert second lower abutment surface formed at the peripheral lower sub-surface and extending downward of the insert first lower abutment surface.

In accordance with a seventh aspect of the subject matter of the present application, there is provided an insert being circumferentially divisible into first, second, third and fourth corner regions; the first corner region comprising: an insert upper abutment surface formed at a peripheral upper sub-surface and extending forward of a peripheral rear sub-surface; and an insert rear abutment surface formed at the peripheral rear sub-surface and extending downward of the peripheral upper sub-surface; the second corner region comprising: a cutting edge connecting the insert side surfaces and being wider than adjacent portions of the peripheral upper surface and a peripheral front sub-surface; the third corner region comprising: an insert first lower abutment surface formed at a peripheral lower sub-surface and extending rearward of the peripheral front sub-surface; and an insert second lower abutment surface formed at the peripheral lower sub-surface and extending downward of the insert first lower abutment surface; the insert being configured to be held in a mounted position in an insert seat by having a clamping force simultaneously applied on, and only on, the insert upper abutment surface, the insert first lower abutment surface; the insert second lower abutment surface, and the insert rear abutment surface.

A heavy duty cutting insert according to any of the aspects above can comprise one or a combination of the following features, each of which can improve performance during heavy duty machining (in accordance with the seating stability/tool longevity advantages described above, although additional specific advantages are stated below):

- Only one of the insert abutment surfaces comprises an insert lateral securing arrangement comprising, e.g., insert first and second inward slanted surfaces. This can reduce the precision needed during manufacture of an insert for a rigid insert seat.
- The lateral securing arrangement can preferably be at a location, e.g. the insert second lower abutment surface, which does not directly oppose the primary cutting forces. It will be understood by the figures that the non-lateral cutting forces are opposed by the insert first lower abutment and rear abutment surfaces. Similarly, it will be understood that an applied force on the insert upper abutment surface can be for ensuring the lateral securing arrangement is secured against an insert pocket. This way the insert upper rear abutment surface and lateral securing arrangement can be protected from the larger machining forces which are countered by the more massive tool. Stated differently, it can be advantageous to have a cutting insert where a first corner (the second corner region) receives the primary machining forces but diverts them to the adjacent corners (the first and third corner regions) since the forth corner region is not abutted by the tool. Advantageously, an insert lateral securing arrangement can be positioned where it does not oppose the primary machining forces.
- The insert upper abutment surface faces away from the peripheral lower sub-surface without facing away from the peripheral front sub-surface. This can allow a clamping force to be directed in a downward direction which is rearward of the insert's peripheral front sub-surface.
- The insert second lower abutment surface extends lower than the insert rear abutment surface.
- The insert second lower abutment surface extends lower than the peripheral rear sub-surface.
- The peripheral front sub-surface extends lower than the insert rear abutment surface.
- The peripheral front sub-surface extends lower than the peripheral rear sub-surface.

Each of the two latter points can assist in avoiding opposing abutment areas providing insert stability and also increases tool longevity

- Insert height and depth differs by less than 40%, preferably less than 25%.
- The insert second lower abutment surface has an insert second lower abutment surface length which is less than one-third of a height of the insert, preferably less than one-sixth, measurable from the peripheral upper sub-surface to the peripheral lower sub-surface.

Each of the two latter points can reduce the depth that a corresponding tool relief sub-surface of a corresponding insert seat needs to extend, thereby allowing adjacent portions of the insert seat to be more rigid.

In accordance with a eighth aspect of the subject matter of the present application, there is provided a tool comprising a tool corner which in turn comprises: opposite tool first and second side surfaces; a tool plane parallel with and located midway between the tool side surfaces; a tool peripheral surface connecting the tool side surfaces; and a rigid insert seat formed at an intersection of the tool peripheral surface and tool first and second side surfaces; the tool peripheral surface comprising: a tool upper sub-surface extending rearward of the insert seat; and a tool front sub-surface extending downward of the insert seat; the insert seat, along the tool peripheral surface, comprising: a tool first lower abutment surface extending rearward of the tool front sub-surface; a tool second lower abutment surface extending downward of the tool first lower abutment surface; a tool rear abutment surface extending downward of the tool upper sub-surface; and a tool relief sub-surface extending between the tool second lower abutment surface and the tool rear abutment surface.

In accordance with an ninth aspect of the subject matter of the present application, there is provided a tool comprising a tool corner which in turn comprises: opposite tool first and second side surfaces; a tool plane parallel with and located midway between the tool side surfaces; a tool peripheral surface connecting the tool side surfaces; and a rigid insert seat formed at an intersection of the tool peripheral surface and tool first and second side surfaces; the tool peripheral surface comprising: a tool upper sub-surface extending rearward of the insert seat; and a tool front sub-surface extending downward of the insert seat; the insert seat, along the tool peripheral surface, comprising: a tool first lower abutment surface extending rearward of the tool front sub-surface; a tool second lower abutment surface extending downward of the tool first lower abutment surface; a tool rear abutment surface extending downward of the tool upper sub-surface; and a tool relief sub-surface extending between the tool second lower abutment surface and the tool rear abutment surface.

A tool according to any of the aspects above can comprise one or a combination of the following features, each of which can improve performance during heavy duty machining (in accordance with the seating stability/tool longevity advantages described above, although additional specific advantages may be stated below):

Only one of the tool abutment surfaces comprises a tool lateral securing arrangement comprising e.g. tool first and second inward slanted surfaces. This can reduce the precision needed during manufacture of a tool having a rigid insert seat.

The tool second lower abutment surface extends lower than the tool rear abutment surface.

The tool first lower abutment surface extends lower than the tool rear abutment surface.

Each of the two latter points can assist in avoiding opposing abutment areas providing insert stability and also increases tool longevity The tool second lower abutment surface has a tool second lower abutment surface length which is less than one-third of a seat height, preferably less than one-sixth.

Seat height and depth differ by less than 40%, preferably less than 25%.

Each of the two latter points can reduce the depth that a corresponding tool relief sub-surface of a corresponding insert seat needs to extend, thereby allowing adjacent portions of the insert seat to be more rigid. It will be understood that the term "rigid" is not meant to limit the material used for the tool or insert seat thereof, which may be made of materials such as steel. Rather that the geometrical structure of the insert seat is not designed to accommodate an insert designed to push apart opposing surfaces of the insert seat to cause a resilient clamping effect on the insert.

While an insert seat with a relatively large tool relief recess could also theoretically function as a rigid insert seat, since resilient clamping is also dependent on the insert geometry, geometrical features such as minimizing the tool relief gap size can still be beneficial.

In accordance with a tenth aspect of the subject matter of the present application, there is provided a clamp comprising: a shank; and a clamp head extending from the shank and comprising a clamp-insert abutment surface.

The clamp can comprise one or a combination of the following features, each of which can improve performance during heavy duty machining:

A clamp rear head portion can extend rearward of the shank. This can allow a clamp-tool abutment surface to abut an adjacent tool-clamp abutment surface and counter a moment caused by clamping of the insert via the clamp-insert abutment surface.

A clamp rear head portion can have a clamp rear surface which is planar shaped. The rear surface can be perpendicular to a central longitudinal plane of the clamp head. This can allow a clamp to be rotationally-oriented correctly when clamping an insert.

At least a clamp rear head portion's clamp upper surface can be provided with a ridge (i.e. having at least one non-orthogonal surface extending to an apex, or, e.g., two inwardly slanted surfaces meeting at an apex). This can allow movement of the tool holding the clamp (particularly when the tool has a correspondingly shaped upper surface, such as a parting-off blade with a slanted ridge shape) when held by a tool holder. The ridge can be a longitudinally extending ridge.

Generally speaking, directions used throughout the specification and claims are relative to other parts of an object or group of objects being described. As will be clear from reading the text in view of the drawings, when a direction is mentioned it is meant "generally". Therefore, for example, if a first surface is said to be, e.g., extending "rearward" of a second surface, it is not necessary that the first surface be orthogonal with the second surface, rather it should be understood the first surface extends in a "generally rearward direction". Stated differently, if a first surface is said to extend rearwardly, this is to be interpreted as the first surface extending more in the rearward direction than any other orthogonal direction, e.g. upwardly or downwardly (i.e. it extends in the defined direction within a tolerance of ±45° thereof).

It will be understood that the above-said is a summary, and that any of the aspects above may further comprise any of the features described hereinbelow. Specifically, the following features, either alone or in combination, may be applicable to any of the above aspects:

i. A tool assembly can comprise an insert, tool and clamp configured to secure the insert to the tool.

ii. An insert can comprise a single-cutting edge only.

iii. An insert can be solid, i.e. devoid of a clamping hole. Such construction may be particularly useful against impact forces incurred during heavy-duty applications.

iv. The insert first and second surfaces can be devoid of a clamping construction (e.g. a clamping hole or recess).
v. An insert can comprise opposite insert first and second side surfaces, and an insert peripheral surface connecting the insert side surfaces.
vi. An insert plane can be parallel with and located midway between insert side surfaces.
The insert can be mirror-symmetric on opposing sides of the insert plane
vii. An insert can have an insert height and an insert depth. The insert height can be measurable from the peripheral upper sub-surface to the peripheral lower sub-surface. The insert depth can be measurable from the peripheral rear sub-surface to the peripheral front sub-surface. The insert height and depth can differ by less than 40% (e.g. if the overall height is 10 mm the depth will be greater than 6 mm or less than 14 mm). Preferably the insert height and depth differ by less than 25%.
viii. An insert front-lower height can be smaller than 40% of an insert height, preferably smaller than 30%. Preferably the insert front-lower height can be greater than 10% of the insert height.
ix. An insert second lower abutment length can be smaller than 40% of an insert height, preferably smaller than 30%,. Preferably the insert second lower abutment length can be greater than 10% of the insert height.
x. An insert can be circumferentially divisible into, and comprise, first, second, third and fourth corner regions. To elaborate: a first corner region can be located in an upper-rear portion of the insert; a second corner region can be located in an upper-front portion of the insert; a third corner region can be located in an lower-front portion of the insert; and a fourth corner region can be located in an lower-rear portion of the cutting insert.
xi. An insert peripheral surface can comprise: a peripheral upper sub-surface extending from the first corner region to the second corner region; a peripheral front sub-surface extending from the second corner region to the third corner region; a peripheral lower sub-surface extending from the third corner region to the fourth corner region; and a peripheral rear sub-surface extending from the fourth corner region to the first corner region.
xii. A peripheral front sub-surface can extend lower than a peripheral rear sub-surface.
xiii. A first corner region can comprise an insert upper abutment surface. The insert upper abutment surface can be formed at a peripheral upper sub-surface. The insert upper abutment surface can extend forward of a peripheral rear sub-surface. The insert upper abutment surface can faces away from the peripheral lower sub-surface without facing away from the peripheral front sub-surface. Stated differently, an imaginary normal line extending downward from the insert upper abutment surface can be rearward of the insert's peripheral front sub-surface.
xiv. A first corner region can comprise an insert rear abutment surface. The insert rear abutment surface can be formed at a peripheral rear sub-surface. The insert rear abutment surface can extend downward of a peripheral upper sub-surface.
xv. A second corner region can comprise a cutting edge connecting the insert side surfaces. The cutting edge can be wider than adjacent portions of the peripheral upper surface and a peripheral front sub-surface. The cutting edge can extend rearward along an intersection of an insert peripheral surface and one or both insert side surfaces.
xvi. A rake surface can extend rearward of a cutting edge, along the insert peripheral surface. The rake surface can be formed with a chip-control arrangement.
xvii. An insert relief surface can extend downward-rearward of a cutting edge, along the insert peripheral surface.
xviii. A third corner region can comprise an insert first lower abutment surface. The insert first lower abutment surface can be formed at a peripheral lower sub-surface. The insert first lower abutment surface can extend rearward of a peripheral front sub-surface.
xix. A third corner region can comprise an insert second lower abutment surface. The insert second lower abutment surface can be formed at the peripheral lower sub-surface. The insert second lower abutment surface can extend downward of an insert first lower abutment surface. The insert second lower abutment surface can extend lower than the peripheral rear sub-surface. The insert second lower abutment surface has an insert second lower abutment surface length (the linear portion of which is measured). The insert second lower abutment surface length can be less than one-third of a height of the insert, preferably less than one-sixth.
xx. At a fourth corner region the insert can be devoid of, or not subjected to, clamping forces.
xxi. An insert can comprise a rearwardly facing insert rear non-abutment surface. The rear non-abutment surface can be located adjacent to and below the insert rear abutment surface. A fourth corner region can comprise the rear non-abutment surface.
xxii. A tool relief sub-surface can comprise a forwardly facing tool rear non-abutment surface. The tool rear non-abutment surface can be located adjacent to and below the tool rear abutment surface.
xxiii. A rear relief gap can separate an insert rear non-abutment surface and a tool rear non-abutment surface. A rear relief gap can be located rearward of an insert and can separate the insert's fourth corner region and the tool relief sub-surface.
xxiv. A tool relief recess can separate an insert's peripheral lower sub-surface and a tool relief sub-surface. A tool relief recess can be located downward of an insert and can separate the insert's fourth corner region and the tool relief sub-surface. Preferably, a tool relief recess can be made to correspond to the size of an insert intended to be received therein (of course being slightly larger so as to provide relief). Such sizing (or, stated differently, minimizing of the size of the tool relief recess) can assist in providing additional rigidity of an insert pocket.
xxv. A rear relief gap can be contiguous with a tool relief recess.
xxvi. An insert abutment surface can comprise an insert lateral securing arrangement. The insert lateral securing arrangement can comprise e.g., insert first and second inward slanted surfaces. Preferably only one of the insert abutment surfaces comprises the insert lateral securing arrangement. Most preferably the insert second lower abutment surface of the third corner region comprises the insert lateral securing arrangement. Without being bound to theory, it is believed that the insert lateral securing arrangement being formed at the insert second lower abutment surface provides the most stable insert seating arrangement. Preferably the insert first and second inward slanted surfaces form a concave shape rather than a convex or ridge shape.
xxvii. A tool can be a parting-off blade. The tool can have an insert seat at each of two diagonally opposed corners thereof. The insert seats can be identical. The tool can be 180° rotationally symmetric about a tool axis extending through the center of tool first and second sides.

xxviii. A tool corner, or an entire tool, can comprise opposite tool first and second side surfaces and a tool peripheral surface connecting the tool side surfaces.

xxix. A tool corner, or an entire tool, can comprise a tool plane parallel with and located midway between tool side surfaces.

xxx. A tool corner can comprise a rigid insert seat or a plurality of rigid insert seats. Each insert seat can be a rigid insert seat. Each insert seat can be formed at an intersection of a tool peripheral surface and tool first and second side surfaces.

xxxi. An insert seat can be located along the tool peripheral surface.

xxxii. An insert seat can comprise a tool first lower abutment surface, a tool second lower abutment surface, a tool rear abutment surface and a tool relief sub-surface.

xxxiii. A seat can have a seat height and a seat depth. The seat height can be measurable from an imaginary extension line of a tool upper sub-surface to a lowermost point of a tool relief sub-surface. A seat depth can be measurable from a tool rear abutment surface to an imaginary extension line of a tool front sub-surface. The seat height and depth can differ by less than 40%. Preferably the seat height and depth differ by less than 25%.

xxxiv. A cutting edge of the insert can be wider than at least a corner of the tool comprising an insert seat, and can be wider than a remainder of the entire tool.

xxxv. A tool first lower abutment surface can extend rearward of a tool front sub-surface.

xxxvi. A tool first lower abutment surface can extend lower than the tool rear abutment surface.

xxxvii. A tool second lower abutment surface can extend downward of a tool first lower abutment surface.

xxxviii. A tool second lower abutment surface can extend lower than a tool rear sub-surface. The tool second lower abutment surface can have a tool second lower abutment surface length (the linear portion of which is measured). The tool second lower abutment surface length can be less than one-third of a seat height, preferably less than one-sixth.

xxxix. A tool rear abutment surface can extend downward of a tool upper sub-surface.

xl. A tool relief sub-surface can extend between a tool second lower abutment surface and a tool rear abutment surface.

xli. A tool peripheral surface can comprise a tool upper sub-surface. The tool upper sub-surface can extend rearward of an insert seat. The tool upper sub-surface can extend the entire length of the tool. The tool upper sub-surface can be can be ridge shaped (i.e. having at least one non-orthogonal surface extending to an apex, or, e.g., two inwardly slanted surfaces meeting at an apex). The tool lower sub-surface can be can be ridge shaped (i.e. having at least one non-orthogonal surface extending to an apex, or, e.g., two inwardly slanted surfaces meeting at an apex).

xlii. A tool peripheral surface can comprise a tool front sub-surface. The tool front sub-surface can extend downward of an insert seat.

xliii. A tool corner can comprise a clamp hole.

xliv. A tool peripheral surface can comprise a clamp hole.

xlv. A clamp hole can be located along the tool upper sub-surface and adjacent to the tool rear abutment surface. The tool peripheral surface can further comprise a tool-clamp abutment surface. The tool-clamp abutment surface can extend upwardly and facing towards the insert seat, from the clamp hole and the tool upper sub-surface.

xlvi. A clamp hole can be, or have a clamp axis $A_c$, slanted in a downward-rearward direction.

xlvii. A tool peripheral surface can comprise a locking screw hole. The locking screw hole can be threaded. The locking screw hole can be located at an opposite side of an insert seat from a clamp hole. The locking screw hole can be located along a tool front sub-surface downward of the tool first lower abutment surface.

xlviii. A clamp hole and locking screw hole can intersect. A locking screw hole and clamp hole can surround an insert seat.

xlix. A clamp's shank can be unthreaded, a locking screw can occupy a locking screw hole formed in the tool front sub-surface; and the locking screw can engage a front recess formed in the clamp.

l. A tool abutment surface can comprise a tool lateral securing arrangement. The tool lateral securing arrangement can comprise, e.g., tool first and second inward slanted surfaces. Preferably only one of the tool abutment surfaces comprises the tool lateral securing arrangement. Most preferably the tool second lower abutment surface comprises the tool lateral securing arrangement. Without being bound to theory, it is believed that the tool lateral securing arrangement being formed at the tool second lower abutment surface provides the most stable insert seating arrangement. Preferably the tool first and second inward slanted surfaces form a convex or ridge shape rather than a concave shape.

li. A clamp can comprise a shank and a clamp head extending from the shank and comprising a clamp-insert abutment surface.

lii. A shank can be non-threaded.

liii. A clamp head can comprise a clamp upper surface, a clamp lower surface and a clamp peripheral surface connecting the clamp upper and lower surfaces.

liv. A clamp head can comprise a clamp front head portion, a clamp rear head portion and a clamp intermediary head portion.

lv. A clamp front head portion can comprise a downwardly directed clamp-insert abutment surface. Stated differently the clamp-insert abutment surface can be located at the clamp front head portion's lower surface.

lvi. A clamp intermediary head portion can be connected to a shank which extends therefrom in a downward direction. Stated differently the shank can be located at the clamp intermediary head portion's lower surface.

lvii. A clamp rear head portion can comprise a clamp-tool abutment surface located at the clamp peripheral surface. A clamp rear head portion can extend rearward of the shank. This can allow the clamp-tool abutment surface to abut an adjacent tool-clamp abutment surface and counter a moment caused by clamping of the insert via a clamp-insert abutment surface.

lviii. A clamp-tool abutment surface can be planar shaped. The clamp-tool abutment surface can be perpendicular to a central longitudinal plane of the clamp head (i.e. the clamp head being elongated in a transverse direction to the shank). This can allow a clamp to be rotationally-oriented about a shank axis correctly for clamping an insert.

lix. At least a clamp rear head portion's clamp upper surface can be ridge shaped (i.e. having at least one non-orthogonal surface extending to an apex, or, e.g., two inwardly slanted surfaces meeting at an apex). This can allow movement of the tool holding the clamp (particularly when the tool has a correspondingly shaped upper surface, such as a parting-off blade with a slanted ridge shape) when held by a tool holder.

lx. An insert can be clamped to the tool by the following abutment configuration: a clamp-insert abutment surface abutting an insert upper abutment surface; a tool first lower abutment surface abutting an insert first lower abutment surface; a tool second lower abutment surface abutting an insert second lower abutment surface; and a tool rear abutment surface abutting an insert rear abutment surface.

lxi. A clamp's clamp-insert abutment surface can simultaneously abut an insert upper abutment surface and the clamp's clamp-tool abutment surface can abut a tool-clamp abutment surface.

lxii. An insert in a mounted-unclamped position in the insert seat can be freely removable.

lxiii. A clamping force caused by a clamp-insert abutment surface abutting an insert upper abutment surface can be directed in a downward direction which is rearward of the insert's peripheral front sub-surface. Preferably the resultant clamping force can be directed rearward of the tool first lower abutment surface.

lxiv. A clamping force caused by a tool second lower abutment surface abutting an insert second lower abutment surface can be directed in a rearward direction towards a region below where the tool rear abutment surface abuts the insert rear abutment surface. A rear relief gap can be located between an insert's peripheral rear sub-surface, below an insert rear abutment surface, and a tool relief sub-surface. At least a portion of the rear relief gap can extend rearward of a tool rear abutment surface. As will be understood, the above-said also excludes the possibility of an additional rear clamping abutment location below where the clamping force is directed.

lxv. An insert can be configured to be held in a mounted position in an insert seat by having a clamping force simultaneously applied on, and only on, the insert upper abutment surface, the insert first lower abutment surface; the insert second lower abutment surface, and the insert rear abutment surface. Stated differently, an insert can be configured to be held in a mounted position in an insert seat by having abutment on, and only on, the insert upper abutment surface, the insert first lower abutment surface; the insert second lower abutment surface, and the insert rear abutment surface.

lxvi. A tool or tool assembly can be configured to hold an insert in a mounted position in an insert seat by having a clamping force simultaneously applied on, and only on, the insert upper abutment surface, the insert first lower abutment surface; the insert second lower abutment surface, and the insert rear abutment surface. Stated differently, a tool or tool assembly can be configured to hold an insert in a mounted position in an insert seat by simultaneously abutment on, and only on, the insert upper abutment surface, the insert first lower abutment surface; the insert second lower abutment surface, and the insert rear abutment surface.

BRIEF DESCRIPTION OF THE DRAWINGS

For a better understanding of the subject matter of the present application, and to show how the same may be carried out in practice, reference will now be made to the accompanying drawings, in which:

FIG. 1A is a partial side view of a tool assembly and a partial view of a workpiece;

FIG. 1B is a front view of the tool assembly in FIG. 1A;

FIG. 1C is a perspective exploded view of the tool assembly in FIG. 1A;

FIG. 2A is an upper perspective view of the cutting insert of the tool assembly in FIG. 1A;

FIG. 2B is a lower perspective view of the cutting insert in FIG. 2A;

FIG. 2C is a top view of the cutting insert in FIG. 2A;

FIG. 2D is a side view of the cutting insert in FIG. 2A, which, unlike the cutting insert views in FIGS. 2A to 2C, is devoid of curvature lines;

FIG. 3A is a front view of a clamp of the tool assembly in FIG. 1A;

FIG. 3B is a section view taken along mid-line 3B-3B in FIG. 3A;

FIG. 3C is a partial view of the clamp taken in the direction of the arrow designated 3C in FIG. 1A;

FIG. 4A is a side perspective view of a tool corner portion of the tool in FIGS. 1A to 1C;

FIG. 4B is another side perspective view of the tool corner portion in FIG. 4A;

FIG. 4C is a front view of the tool corner portion in FIG. 4A;

FIG. 4D is a section view taken along mid-line 4D-4D in FIG. 4C;

DETAILED DESCRIPTION

Figure 2E:
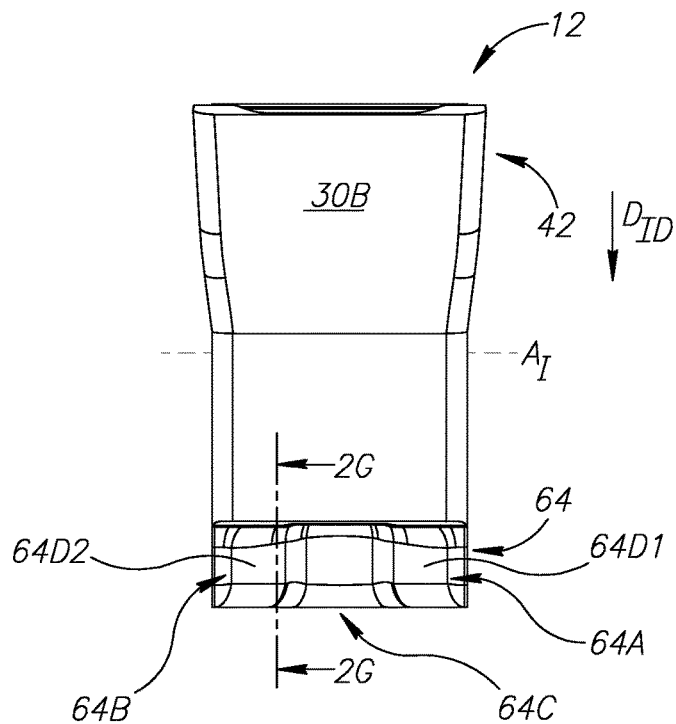
FIG. 2E is a front view of the cutting insert in FIG. 2A.

Referring to FIGS. 1A and 1B, illustrated is an exemplary tool assembly 10 comprising an insert 12, a tool 14 and a clamp 16 for securing the insert 12 to the tool 14 in the mounted-clamped position shown.

The tool assembly 10 can be configured for parting-off a portion of a cylindrical rotating workpiece 18, when moved in a forward direction $D_F$ towards the workpiece 18. The exemplary tool assembly shown is designed for being held in a parting-off block (not shown).

Referring also to FIG. 1C, the clamp 16 can be part of a clamp mechanism 20, comprising a locking screw 22, anti-fallout member 24, and clamp-spring 26. It will be understood that while this is a preferred clamping arrangement, other arrangements such as the clamp having a threaded screw shank and/or only some of the above mentioned clamp assembly elements may be used.

The locking screw 22 can comprise a tool-receiving configuration 22A (e.g. a Torx® configuration) at a proximal end, a conical abutment surface 22B at an opposing distal end, and an external thread 22C therebetween.

The anti-fallout member 24 can comprise a tool-receiving configuration 24A (e.g. a Torx® configuration) at one end and an external thread 24B extending therefrom.

Drawing attention to FIGS. 2A to 2D, the insert 12 is shown in detail.

The insert 12 is for metal machining operations and can be typically made of extremely hard and wear-resistant material such as cemented carbide. Advantageously, the insert 12 can be pressed to final dimensions as per the example described herein. It will be understood that different chip-control arrangements may warrant a grinding step, but that even less ground surfaces on a cutting insert is still advantageous.

The insert 12 is a solid insert comprising opposite insert first and second side surfaces 28A, 28B and an insert peripheral surface 30 connecting the insert side surfaces 28A, 28B.

The insert peripheral surface 30 can comprise a peripheral upper sub-surface 30A, a peripheral front sub-surface 30B, a peripheral lower sub-surface 30C, and a peripheral rear sub-surface 30D.

Insert forward, rearward, upward and downward directions $D_{IF}$, $D_{IR}$, $D_{IU}$, $D_{ID}$ are shown for the purposes of explanation. These directions are not meant in absolute terms but only as reference to relative positions of other portions of the insert 12.

Also shown in FIG. 2C are insert first and second width directions $D_{IW1}$, $D_{IW2}$ which are parallel, but not necessarily coaxial with an insert center axis $A_I$ extending perpendicular to the insert side surfaces 28A, 28B (noting that functional portions in an exemplified second region $R_2$ described hereinafter, is not taken into account for the overall orientation of the side surfaces 28A, 28B). Additionally, an insert plane $P_I$ is shown which is parallel with and located midway between the insert side surfaces 28A, 28B.

As shown in FIG. 2D, an insert center axis $A_I$ can be used to divide the insert (theoretically) into first, second, third and fourth corner regions $R_1$, $R_2$, $R_3$, $R_4$ using a vertically extending height plane $P_H$ containing the insert center axis $A_I$ and extending perpendicular to the insert first and second surfaces 28A, 28B and a horizontally extending depth plane $P_D$ orthogonal thereto and also containing the insert center axis $A_I$. As this theoretical division is merely to assist understanding of the relative locations of various components, it will be understood that the description below does not rely on exact boundary positions of the corner regions being defined and that terms vertical and horizontal are relative to the insert and are not meant to restrict orientation of an insert relative to the foolr.

Using the relative directions, the first corner region $R_1$ is in an upper-rear portion of the insert 12, the second corner region $R_2$ in an upper-front portion thereof, the third corner region $R_3$ in a lower-front portion thereof, and the fourth corner region $R_4$ in a lower-rear portion thereof.

The first corner region $R_1$ can be recessed as shown. This can reduce upward projection of the clamp 16, such upward projection being undesired as it can impede chip flow (not shown).

The first corner region $R_1$ can comprise an insert upper abutment surface 32A and an insert rear abutment surface 32B.

The insert rear abutment surface 32B can comprise rear projection portions 32B1, 32B2 separated by a rear recess 32B3 to assist precision insert positioning, even without the abutment surfaces being ground. It will be understood that such positioning construction is preferred (i.e., two projections separated by a recess), even though other constructions are possible.

Notably, the insert upper abutment surface 32A can be planar shaped (i.e. free of a projection-recess arrangement) since preferably, only abutment surfaces intended to contact an insert seat 92A are intended for positioning of the insert.

A second corner region $R_2$ can comprise a cutting edge 34, rake surface 36 formed, e.g., with a chip-control arrangement 38, which in this example takes the form of a recess (FIG. 2A), and a rearwardly tapering insert relief surface 37 (FIG. 2D).

The cutting edge 34, in this example comprises a central portion 34A which connects the insert side surfaces 28A, 28B. The cutting edge central portion 34A can be wider than an adjacent portion 40 of the peripheral upper surface 30A (shown in FIG. 2C). The cutting edge central portion 34A can be wider than an adjacent portion 42 of the peripheral front sub-surface 30B (shown in FIG. 2E). In this example, the cutting edge 34 can also comprise first and second edge-portions 34B, 34C (FIG. 2A) extending along each insert side surface 28A, 28B.

For the insert 12 to be configured for parting-off, it is beneficial for the cutting edge to be wider than the remainder of the insert 12 in a direction perpendicular to the insert center axis $A_I$, as understood from FIG. 2E.

The third corner region $R_3$ can comprise an insert first lower abutment surface 32C and an insert second lower abutment surface 32D.

For similar reasons to those mentioned above in connection with the insert rear abutment surface 32B, the insert first lower abutment surface 32C comprises projection portions 32C1, 32C2 separated by a recess 32C3 (FIG. 2B).

An insert overall height H1 (also called the "insert height") is shown extending from an uppermost point 44 of the peripheral upper sub-surface 30A to a lowermost point 46 of the peripheral lower sub-surface 30C. In this example, H1=12 mm.

An insert front height H2 is shown along the peripheral front sub-surface 30B, i.e. from the uppermost point 44 of the peripheral upper sub-surface 30A to a lowermost point 48 of the insert first lower abutment surface 32C. In this example, H2=10 mm.

It will be noted that optional but preferred manufacturing relief recesses (e.g. 50A, 50B, 50C), are not considered for these measurements. It will also be understood that even if considered, their values are small relative to the dimensions under discussion.

An insert front-lower height H3 is shown from the lowermost point 48 of the insert first lower abutment surface 32C and parallel with the insert overall height H1, to the lowermost point 46 of the peripheral lower sub-surface 30C. In this example, H3=2 mm.

An insert second lower abutment length H4 is shown measurable along a line parallel with the insert second lower abutment surface 32D and starting from an upper end 52A of a linear portion adjacent a radius and extending to a lower end 52B of the linear portion. In this example, H4=1 mm.

An insert lower rear height H5 is shown from a lowermost point 46 of the insert peripheral lower sub-surface 30C to a lowermost point 54 of the peripheral rear sub-surface 30D. In this example, H5=2.3 mm.

An insert mid-rear height H6 is shown from the lowermost point 54 of the peripheral rear sub-surface 30D to an uppermost point 56 thereof. In this example, H6=6.4 mm.

An insert upper rear height H7 is shown from the uppermost point 56 of the peripheral rear sub-surface 30D to the uppermost point 44 of the peripheral upper sub-surface. In this example, H7=3.3 mm.

An insert overall depth H8 (also called the "insert depth") is shown extending from a rearmost point 60 of the peripheral rear sub-surface 30D to a front point 62 of the peripheral front sub-surface 30B. In this example, H8=12 mm.

Even though specific measurements are given above, it will be understood that the proportions shown are optimal values that should be considered as preferred ranges relative to each other (at least when differed by less than 25%, and preferably less than 15%). For example, the present values are H1=12 mm and H3=2.3 mm. Accordingly for a value of H3=2.3 mm, H1 should preferably be designed within 25% of 12 mm (i.e. ±3 mm) or stated differently: 9 mm≤H1≤15 mm, and more preferably 10.2 mm≤H1≤13.8 mm. It will be understood that for the smaller abutment lengths, e.g. the insert second lower abutment surface 32D, a minimum size is need for functionality and it may not be practical to reduce the size much or at all from the value given.

In this example the fourth corner region $R_4$ is formed with a chamfered shape. Above the chamfer, the fourth corner region $R_4$ can comprise a rearwardly facing insert rear non-abutment surface 32BN, which is located adjacent to and below the insert rear abutment surface 32B. As seen in the side view of FIG. 2D, the insert rear abutment surface 32B and insert rear non-abutment surface 32BN can be collinear.

FIGS. 2B, and 2E to 2G, show an insert lateral securing arrangement 64 is shown.

The insert lateral securing arrangement 64 can comprises insert first and second inward slanted surfaces 64A, 64B. A relief recess 64C is shown between the slanted surfaces 64A, 64B.

Figure 2F:
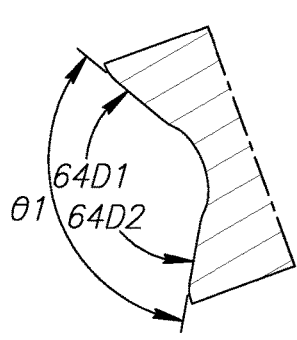
FIG. 2F is a section view taken along line 2F-2F in FIG. 2D.

FIG. 2F shows the insert first and second inward slanted surfaces 64A, 64B forming a concave shape. An obtuse external angle θ1 of between 110° and 130° is preferred, with values closer to 120° being considered more preferred.

Figure 2G:
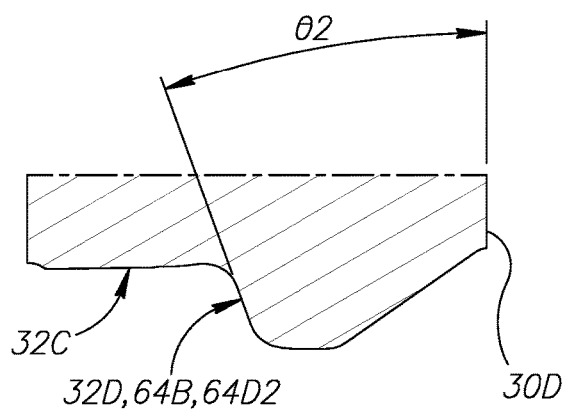
FIG. 2G is a section view taken along line 2G-2G in FIG. 2E.

Since the slanted surfaces in this example extend inwards, only a section taken from an inner perspective view, in this case section 2G-2G, i.e. FIG. 2G, shows how the slanted surfaces can also, preferably, be forwardly inclined relative to the peripheral rear sub-surface. Most preferably at an internal angle θ2 of between 10° and 30°, with values closer to 20° being considered more preferred.

Ideally, the slanted surfaces 64A, 64B contact the tool 14 via the centrally located insert securing portions designated 64D1, 64D2.

Drawing attention to FIGS. 1C, and 3A to 3C, the clamp 16, and the clamp mechanism 20 is shown in detail.

Clamp forward, rearward, upward and downward directions $D_{CF}$, $D_{CR}$, $D_{CU}$, $D_{CD}$ are shown for the purposes of explanation. These directions are not meant in absolute terms but only as reference to relative positions of other portions of the clamp 16. Also shown are clamp first and second width directions $D_{CW1}$, $D_{CW2}$ which are orthogonal to a clamp plane $P_C$.

The clamp 16 can comprise a clamp head 66 extending from a shank 68.

The clamp head 66 can comprise a clamp upper surface 70A, a clamp lower surface 70B and a clamp peripheral surface 70C connecting the clamp upper and lower surfaces 70A, 70B.

The clamp head 66 can comprise a clamp front head portion 72A, a clamp rear head portion 72B and a clamp intermediary head portion 72C.

A clamp front head portion 72A can comprise a downwardly directed clamp-insert abutment surface 74A. The clamp-insert abutment surface 74A can preferably be planar shaped.

The clamp intermediary head portion 72C can have the same depth (along the clamp forward and rearward directions $D_{CF}$, $D_{CR}$) as the shank 68, and can be, optionally integrally, connected thereto via the clamp lower surface 70B.

The clamp rear head portion 72B can comprise a clamp-tool abutment surface 76 located at the clamp peripheral surface 70C. The clamp-tool abutment surface 76 can be planar shaped.

A central longitudinal clamp plane $P_C$ of the clamp head 66 can coincide with line 3B and is oriented perpendicular to the sheet showing FIG. 3A.

Referring to FIG. 3C, the clamp upper surface 70A at, at least, the clamp rear head portion 72B of the clamp can be ridge shaped 78. In this example there are two clamp inwardly slanted surfaces 78A, 78B meeting at a clamp apex 78C.

The shank 68 can be cylindrical and extend from the clamp head 66 to a shank end 80.

The shank 68 can comprise first and second recesses 82, 84.

The first recess 82 faces forward and is configured to receive the locking screw 22 therein, for holding the clamp 16 against the insert 12 in a clamped position. The first recess 82 and locking screw 22 may be structurally and functionally similar to the "first recess 18E" and "biasing screw 20" disclosed in U.S. Pat. No. 9,033,621, the description of which is incorporated herein by reference, and hence will not be described in more detail.

The second recess 84 faces rearward and is configured to prevent undesired ejection of the clamp 16 from a clamp hole 102. This function may be best appreciated from the view in FIG. 5B, which is before the locking screw 22 is released. While the clamp-spring 26 is considered beneficial in quick release of an insert 12, it also increases the tendency for the clamp 16 to fall from the tool when unclamping the insert 12, hence the benefit of the second recess and antifallout member 24. It will be understood that such construction may be less beneficial in circumstances when the spring, instead, is configured to pull the clamp 16 into the clamp hole or there is no spring in a design.

The tool 14 will be described in more detail as well as a corner portion 90A (FIG. 1C), thereof which is shown in more detail in FIGS. 4A to 4D.

The corner portion 90A, and in this example the entire tool 14, can comprise opposite tool first and second side surfaces 86A, 86B and a tool peripheral surface 88 (FIG. 1A) connecting the tool side surfaces 86A, 86B.

Tool forward, rearward, upward and downward directions ($D_{TF}$, $D_{TR}$, $D_{TU}$, $D_{TD}$) are shown for the purposes of explanation. These directions are not meant in absolute terms but only as reference to relative positions of other portions of the tool 14. Also shown are tool first and second width directions $D_{TW1}$, $D_{TW2}$ which are parallel, but not necessarily coaxial with a tool plane $P_T$ extending perpendicular to the tool side surfaces 86A, 86B.

A tool axis $A_T$ is schematically shown in the center of the tool 14 in FIG. 1A.

The tool 14, in this example, is a parting-off blade. For the tool 14 to be configured for parting-off, it is beneficial for the cutting edge of the insert 12 to have a width $W_E$ (FIG. 1B) wider than the at least a corner 90A of the tool 14 which comprises the insert seat 92A, and even more beneficially wider than a width $W_B$ of the remainder of the entire tool 14.

The tool 14 can, for example as shown, have an additional insert seat 92B at another corner 90B.

The tool 14 can be 180° rotationally symmetric about the tool axis $A_T$.

Referring to FIG. 1A, the tool peripheral surface 88 can comprise a tool upper sub-surface 88A, a tool front sub-surface 88B, a tool lower sub-surface 88C, and a tool rear sub-surfaces 88D.

The tool upper sub-surface 88A can be ridge shaped with a longitudinally extending upper ridge 94. In this example there are two tool inwardly slanted surfaces 94A, 94B meeting at a tool upper apex 94C.

The tool lower sub-surface 88C can also be ridge shaped with a longitudinally extending lower ridge 96 as shown in FIG. 1B. In this example there are two tool inwardly slanted surfaces 96A, 96B meeting at a tool lower apex 96C.

FIGS. 4A to 4D do not show the upper ridge 94 and is limited upwardly to the dashed line Y in FIG. 1C, and similarly the corner only extends downwardly to the dashed line X in FIG. 1C. This is because the corner portion views have been taken only to relate to elements of the exemplary design connected with mounting the insert 12 and can be applied to different tools, e.g. those that do not have ridge shaped elements.

The insert seat 92A can comprise an upwardly facing tool first lower abutment surface 98C, a rearwardly facing tool second lower abutment surface 98D, a forwardly facing tool rear abutment surface 98B and a tool relief sub-surface 98E between the second lower abutment surface 98D and the tool rear abutment surface 98B. The tool relief sub-surface 98E can comprise a forwardly facing tool rear non-abutment surface 98BN. The rear non-abutment surface 98BN located adjacent to and below the tool rear abutment surface 98B.

Figure 5A:
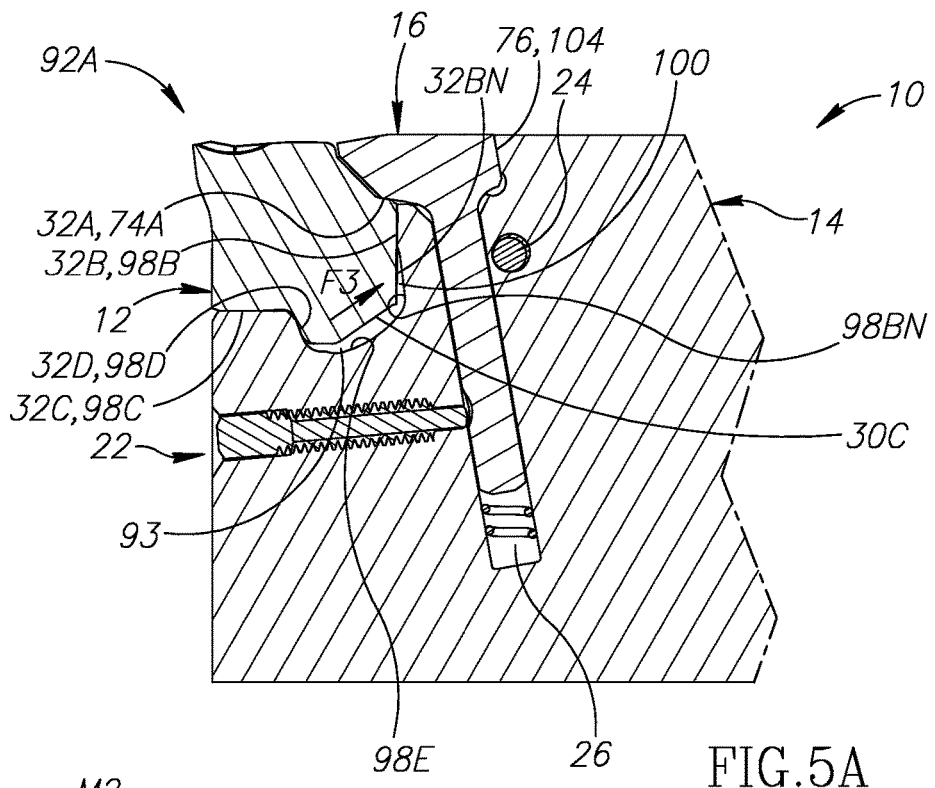
FIG. 5A is a section view taken along line 5A-5A in FIG. 1B.
Figure 5B:
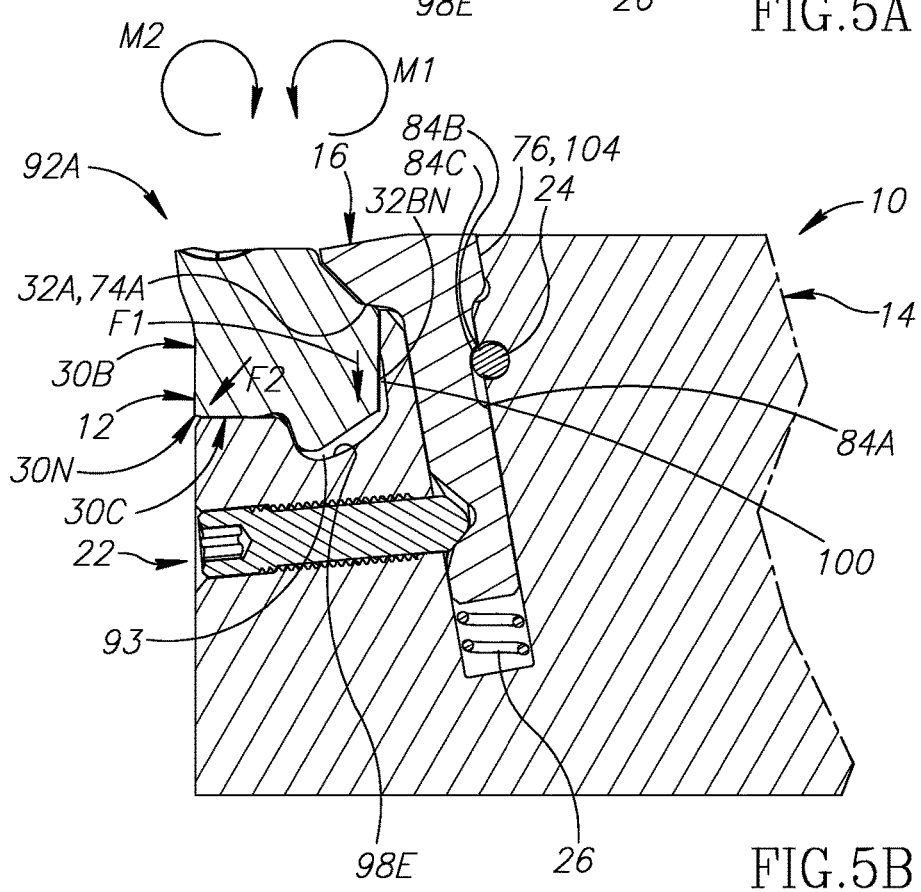
FIG. 5B is a section view taken along mid-line 5B-5B in FIG. 1B.

When a cutting insert 12 occupies the insert seat 92A, a tool relief recess 93 is formed between the cutting insert's peripheral lower sub-surface 30C and the tool relief sub-surface 98E. Also, a rear relief gap 100 can separate the insert rear non-abutment surface 32BN and the tool rear non-abutment surface 98BN. The rear relief gap 100 can be contiguous with the tool relief recess 93, in a side view of the tool. As best seen in FIGS. 5A and 5B at least a portion of the rear relief gap 100 can extend rearward of the tool rear abutment surface 98B.

The tool peripheral surface 88 adjacent the insert seat 92A can comprise the clamp hole 102. It will be noted that a clamp axis $A_C$ is slanted in a downward-rearward direction. The slanted orientation of the clamp hole 102 provides additional thickness and hence structural strength to the wall of the insert seat 92A, most notably beneficial adjacent to the rear relief gap 100. Such structural strength is provided while keeping the clamp head 66 proximate to an insert 12 in a mounted-clamped position to reduce bending forces on the clamp 16.

The tool peripheral surface 88 can comprise a forwardly facing tool-clamp abutment surface 104. The tool-clamp abutment surface 104 can face the insert seat, and extend upwardly from behind clamp hole 102 towards the tool upper sub-surface 88A. The tool-clamp abutment surface 104 can be oriented parallel with the clamp axis $A_C$ (in this example it also extends in a downward-rearward direction) for mounting of the clamp 16 to the corner 90A.

The tool peripheral surface 88 can comprise a locking screw hole 106. The locking screw hole 106 can comprise internal threading 108. It will be noted that a screw axis $A_S$ is similarly not orthogonal with the tool front sub-surface 88B but slanted in an upward-rearward direction.

The insert seat 92B can have a seat height L1 extending from an imaginary first extension line E1 of the tool upper sub-surface 88A (at a height of the dashed line Y in FIG. 1C, i.e. excluding the optional upper ridge 94) to a lowermost point 110 of the tool relief sub-surface 98E. In this example L1=12.4 mm.

A tool front height L2 extends from the tool first lower abutment surface 98C to the imaginary first extension line E1. In this example, L2=10 mm.

A tool front-lower height L3 extends from the lowermost point 110 of the tool relief sub-surface 98E and parallel with the tool height L1, to the tool first lower abutment surface 98C. In this example, L3=2.4 mm.

A tool second lower abutment length L4 extends along a line parallel with the tool second lower abutment surface 98D and starting from an upper end 112A of a linear portion 114 adjacent a radius and extending to a lower end 112B of the linear portion. In this example, L4=1 mm.

A tool lower rear height L5 extends from the tool first lower abutment surface 98C to an imaginary second extension line E2 parallel with the first extension line E1 and extending from a lowermost point 116 of the tool rear abutment surface 98B. In this example, L5=3.8 mm.

A tool mid-rear height L6 is shown from the lowermost point 116 of the tool rear abutment surface 98B to an uppermost point 118 thereof. In this example, L6=2.6 mm.

A tool upper rear height L7 is shown from an uppermost point 118 of the tool rear abutment surface 98B (or an extension line E3 extending therefrom and parallel with the first extension line E1) to the first extension line E1. In this example, L7=3.6 mm.

A tool overall depth L8 (also called the "tool depth") is shown extending from the tool rear abutment surface 98B to an imaginary fourth extension line E4, parallel with and extending from the tool front sub-surface 88B. In this example, L8=11 mm.

Even though specific measurements are given above, it will be understood that the proportions shown are optimal values that should be considered as preferred ranges relative to each other (at least when differed by less than 25%, and preferably less than 15%).

Referring to FIGS. 4A and 4B, a tool lateral securing arrangement 120 is shown formed at the tool second lower abutment surface 98D. The tool lateral securing arrangement 120 complements the insert securing arrangement 64, mutatis mutandis. For example the tool lateral securing arrangement 120 can comprise tool first and second inward slanted surfaces 120A, 120B. A securing arrangement nose 120C is shown between the slanted surfaces. FIG. 4A shows the tool first and second inward slanted surfaces 120A, 120B forming a convex shape. An obtuse internal angle θ3 of between 110° and 130° is preferred, with values closer to 120° being considered more preferred.

The tool's slanted surfaces can also, preferably, be forwardly inclined to correspond to the insert's inclination. Preferably they are forwardly inclined at an external angle of between 10° and 30°, with values closer to 20° being considered more preferred.

In FIGS. 4A, 4B, schematically shown are intended abutment regions.

Ideally, the slanted surfaces 64A, 64B of the insert 12 contact centrally located tool securing portions designated 120D1, 120D2.

Referring to FIG. 4B, it will be noted that although the tool first lower abutment surface 98C is planar, contact with the insert first lower abutment surface's projection portions 32C1, 32C2 results in spaced apart abutment regions designated 98C1, 98C2.

Similarly, although the tool rear abutment surface 98B is planar, contact with the insert rear abutment surface's projection portions 32B1, 32B2 results in spaced apart abutment regions designated 98B1, 98B2.

It will be apparent from the description of the insert 12 and the tool 14 why the abutment surfaces advantageously, but not essentially, are configured to contact at pairs of spaced apart abutment regions. It will also be noted that it is preferred that the abutment surfaces of the insert have concave shapes (i.e. comprising the projections and recess).

Referring also to FIGS. 5A and 5B, mounting and removal of the insert 12 to the tool assembly 10, which in this example comprises a clamp mechanism 20, will be explained.

Initially, when the insert 12 is spaced apart from the tool 14, i.e. before the insert 12 is mounted to the tool 14, the locking screw 22 is in a retracted position (not shown) such that the conical abutment surface 22B does not apply an upward or downward force on the clamp 16.

The clamp 16, according to this example, is biased by the clamp-spring 26 in an upward direction and is retained in the tool 14 by abutment of the anti-fallout member 24 and a lower surface 84A of the second recess 84 of the clamp 16.

The insert 12 is then mounted to the insert seat 92A in a mounted-unclamped first position, i.e. the insert 12 can be freely removed, e.g. without a tool. This is because the insert seat 92A is a rigid insert seat which is not configured to flex elastically when the insert is mounted thereto and grip the insert 12.

In the mounted-unclamped first position, the tool first lower abutment surface 98C abuts the insert first lower abutment surface 32C (FIG. 5A); the tool second lower abutment surface 98D abuts the insert second lower abutment surface 32D (FIG. 5A); and the tool rear abutment surface 98B abuts the insert rear abutment surface 32B (FIGS. 5A and 5B). However, the rear relief gap 100 is present between the insert rear non-abutment surface 32BN and the tool rear non-abutment surface 98BN.

The locking screw 22 is then moved towards the clamp 16, and the conical abutment surface 22B contacts the first recess 82 thereby moving the clamp 16 downwardly, compressing the clamp-spring 26 and, in addition to the insert and tool abutting via the surfaces mentioned above, also causing the clamp-insert abutment surface 74A to abut the insert upper abutment surface 32A (FIGS. 5A and 5B), to secure the insert 12 in a mounted-clamped second position as shown in FIGS. 1A, 1B etc. Notably, the second recess 84 is designed to not contact the anti-fallout member 24 in this position (FIG. 5B) and thus a gap 84C remains between an upper surface 84B of the second recess 84 and the anti-fallout member 24. In this second position, the rear relief gap 100 remains between the insert rear non-abutment surface 32BN and the tool rear non-abutment surface 98BN.

According to this example, the clamp 16 remains in a correct rotational alignment by the planar shaped clamp-tool abutment 76 and planar shaped tool-clamp abutment surfaces 104 abutting each other. This abutment also provides a counter moment M1 to the moment M2 caused by abutment of the clamp-insert abutment surface 74A with the insert upper abutment surface 32A (FIG. 5B).

Notably, a resultant first clamping force $F_1$ (FIG. 5B) caused by the clamp-insert abutment surface 74A abutting the insert upper abutment surface 32A can be directed downwardly in a direction which is rearward of the insert's peripheral front sub-surface 30B, and preferably can even be rearward of the insert's first and second lower abutment surfaces 32C, 32D. Since the clamp-insert abutment surface 74A and the insert upper abutment surface 32A are both planar, the first clamping force $F_1$ is in an orthogonal direction to these surfaces.

To elaborate, if the first clamping force $F_1$ would be replaced with a hypothetical clamping force designated as $F_2$, which is shown as directed at an intersection 30N of the insert's peripheral front and lower sub-surfaces 30B, 30C (and thus not be directed "rearward" of the insert's peripheral front sub-surface 30B) such force direction could cause the insert 12 to tend to pivot during machining. Such pivoting being even more likely if the resultant force would be directed even more towards the insert's peripheral front sub-surface 30B.

A resultant additional clamping force $F_3$ caused by the tool second lower abutment surface 98D abutting the insert second lower abutment surface 32D is directed in a rearward direction towards a region below where the tool rear abutment surface 98B abuts the insert rear abutment surface 32B. Stated differently, the additional clamping force $F_3$ is directed towards the rear relief gap 100. This can assist in avoiding causing the insert pocket 92A from having a resilient clamping effect.

What is claimed is:

1. A tool assembly comprising, in combination:
   an insert,
   a tool, and
   a clamp configured to secure the insert to the tool;
   the insert comprising:
      opposite insert first and second side surfaces;
      an insert plane parallel with and located midway between the insert side surfaces;
      an insert peripheral surface connecting the insert side surfaces;
      a first corner region located in an upper-rear portion of the cutting insert;
      a second corner region located in an upper-front portion of the cutting insert;
      a third corner region located in an lower-front portion of the cutting insert; and
      a fourth corner region located in an lower-rear portion of the cutting insert;
   the insert peripheral surface comprising:
      a peripheral upper sub-surface extending from the first corner region to the second corner region;
      a peripheral front sub-surface extending from the second corner region to the third corner region;
      a peripheral lower sub-surface extending from the third corner region to the fourth corner region; and
      a peripheral rear sub-surface extending from the fourth corner region to the first corner region;
   the first corner region comprising:
      an insert upper abutment surface formed at the peripheral upper sub-surface and extending forward of the peripheral rear sub-surface; and
      an insert rear abutment surface formed at the peripheral rear sub-surface and extending downward of the peripheral upper sub-surface;
   the second corner region comprising:
      a cutting edge connecting the insert side surfaces and being wider than adjacent portions of the peripheral upper and front sub-surfaces;
   the third corner region comprising:
      an insert first lower abutment surface formed at the peripheral lower sub-surface and extending rearward of the peripheral front sub-surface; and
      an insert second lower abutment surface formed at the peripheral lower sub-surface and extending downward of the insert first lower abutment surface;
   the tool comprising a tool corner having:
      opposite tool first and second side surfaces;
      a tool plane parallel with and located midway between the tool side surfaces;
         a tool peripheral surface connecting the tool side surfaces; and
         a rigid insert seat formed at an intersection of the tool peripheral surface and tool first and second side surfaces;

the tool peripheral surface at the tool corner further comprising:
  a tool upper sub-surface extending rearward of the insert seat; and
  a tool front sub-surface extending downward of the insert seat;
the insert seat, along the tool peripheral surface, comprising:
  a tool first lower abutment surface extending rearward of the tool front sub-surface;
  a tool second lower abutment surface extending downward of the tool first lower abutment surface;
  a tool rear abutment surface extending downward of the tool upper sub-surface; and
  a tool relief sub-surface extending between the tool second lower abutment surface and the tool rear abutment surface;
the clamp comprising:
  a shank; and
  a clamp head extending from the shank and comprising a clamp-insert abutment surface;
wherein, the insert is clamped to the tool by the following abutment configuration:
  the clamp-insert abutment surface abutting the insert upper abutment surface;
  the tool first lower abutment surface abutting the insert first lower abutment surface;
  the tool second lower abutment surface abutting the insert second lower abutment surface; and
  the tool rear abutment surface abutting the insert rear abutment surface;
wherein:
  a first clamping force F1 caused by the clamp-insert abutment surface abutting the insert upper abutment surface is directed in a downward direction which is rearward of the insert's peripheral front sub-surface; and
  a second clamping force F3 caused by the tool second lower abutment surface abutting the insert second lower abutment surface is directed in a rearward direction towards a region below where the tool rear abutment surface abuts the insert rear abutment surface.

2. The tool assembly according to claim 1, wherein: the insert comprises a rearwardly facing insert rear non-abutment surface which is located adjacent to and below the insert rear abutment surface; the tool relief sub-surface comprises a forwardly facing tool rear non-abutment surface which is located adjacent to and below the tool rear abutment surface; and a rear relief gap separates the insert rear non-abutment surface and the tool rear non-abutment surface.

3. The tool assembly according to claim 1, wherein a rear relief gap is located rearward of the insert and separates the insert's fourth corner region and the tool relief sub-surface.

4. The tool assembly according to claim 3, wherein at least a portion of the rear relief gap extends rearward of the tool rear abutment surface.

5. The tool assembly according to claim 1, wherein a tool relief recess is located downward of the insert and separates the insert's fourth corner region and the tool relief sub-surface.

6. The tool assembly according to claim 1, wherein a rear relief gap is located rearward of the insert and separates the insert's fourth corner region and the tool relief sub-surface, a tool relief recess is located downward of the insert and separates the insert's fourth corner region and the tool relief sub-surface, and the rear relief gap is contiguous with the tool relief recess.

7. The tool assembly according to claim 1, wherein the tool and insert second lower abutment surfaces each comprise a lateral securing arrangement, and the lateral securing arrangement of the tool second lower abutment surface is the only lateral securing arrangement of the insert seat.

8. The tool assembly according to claim 1, wherein, when the insert is in a mounted-unclamped position in the insert seat, the insert is freely removable.

9. The tool assembly according to claim 1, wherein the insert second lower abutment surface extends lower than the insert rear abutment surface.

10. The tool assembly according to claim 1, wherein the insert second lower abutment surface extends lower than the peripheral rear sub-surface.

11. The tool assembly according to claim 1, wherein the peripheral front sub-surface extends lower than the insert rear abutment surface.

12. The tool assembly according to claim 1, wherein the peripheral front sub-surface extends lower than the peripheral rear sub-surface.

13. The tool assembly according to claim 1, wherein:
  the insert had a depth extending from a rearmost point of the peripheral rear sub-surface to a front point of the peripheral front sub-surface; and
  the insert's height and depth differ by less than 25%.

14. The tool assembly according to claim 1, wherein at least a clamp rear head portion's clamp upper surface is provided with a ridge.

15. The tool assembly according to claim 14, wherein a clamp rear head portion has a clamp-tool abutment surface which is planar shaped.

16. The tool assembly according to claim 1, wherein, simultaneously: (i) the clamp's clamp-insert abutment surface abuts the insert upper abutment surface; and (ii) a clamp's clamp-tool abutment surface abuts a tool-clamp abutment surface.

17. The tool assembly according to claim 1, wherein the cutting edge of the insert is wider than at least the corner of the tool comprising the insert seat.

18. The tool assembly according to claim 1, wherein a clamp hole is located along the tool upper sub-surface and is adjacent to the tool rear abutment surface, and is slanted in a downward-rearward direction.

19. The tool assembly according to claim 1, wherein: the clamp's shank is unthreaded; a locking screw occupies a locking screw hole formed in the tool front sub-surface; and the locking screw engages a front recess formed in the clamp.

20. A tool assembly comprising, in combination:
  an insert,
  a tool, and
  a clamp configured to secure the insert to the tool;
the insert comprising:
  opposite insert first and second side surfaces;
  an insert plane parallel with and located midway between the insert side surfaces;
  an insert peripheral surface connecting the insert side surfaces;
  a first corner region located in an upper-rear portion of the cutting insert;
  a second corner region located in an upper-front portion of the cutting insert;
  a third corner region located in an lower-front portion of the cutting insert; and
  a fourth corner region located in an lower-rear portion of the cutting insert;
the insert peripheral surface comprising:

a peripheral upper sub-surface extending from the first corner region to the second corner region;
a peripheral front sub-surface extending from the second corner region to the third corner region;
a peripheral lower sub-surface extending from the third corner region to the fourth corner region; and
a peripheral rear sub-surface extending from the fourth corner region to the first corner region;
the first corner region comprising:
an insert upper abutment surface formed at the peripheral upper sub-surface and extending forward of the peripheral rear sub-surface; and
an insert rear abutment surface formed at the peripheral rear sub-surface and extending downward of the peripheral upper sub-surface; with the peripheral front sub-surface extending lower than the insert rear abutment surface;
the second corner region comprising:
a cutting edge connecting the insert side surfaces and being wider than adjacent portions of the peripheral upper and front sub-surfaces;
the third corner region comprising:
an insert first lower abutment surface formed at the peripheral lower sub-surface and extending rearward of the peripheral front sub-surface; and
an insert second lower abutment surface formed at the peripheral lower sub-surface and extending downward of the insert first lower abutment surface;
the tool comprising a tool corner having:
opposite tool first and second side surfaces;
a tool plane parallel with and located midway between the tool side surfaces;
a tool peripheral surface connecting the tool side surfaces; and
a rigid insert seat formed at an intersection of the tool peripheral surface and tool first and second side surfaces;
the tool peripheral surface at the tool corner further comprising:
a tool upper sub-surface extending rearward of the insert seat; and
a tool front sub-surface extending downward of the insert seat;
the insert seat, along the tool peripheral surface, comprising:
a tool first lower abutment surface extending rearward of the tool front sub-surface;
a tool second lower abutment surface extending downward of the tool first lower abutment surface;
a tool rear abutment surface extending downward of the tool upper sub-surface; and
a tool relief sub-surface extending between the tool second lower abutment surface and the tool rear abutment surface;
the clamp comprising:
a shank; and
a clamp head extending from the shank and comprising a clamp-insert abutment surface;
wherein, the insert is clamped to the tool by the following abutment configuration:
the clamp-insert abutment surface abutting the insert upper abutment surface;
the tool first lower abutment surface abutting the insert first lower abutment surface;
the tool second lower abutment surface abutting the insert second lower abutment surface; and
the tool rear abutment surface abutting the insert rear abutment surface;

wherein:
the insert's fourth corner region comprises a rearwardly facing insert rear non-abutment surface which is located adjacent to and below the insert rear abutment surface;
the tool relief sub-surface comprising a forwardly facing tool rear non-abutment surface which is located adjacent to and below the tool rear abutment surface;
a rear relief gap separates the insert rear non-abutment surface and the tool rear non-abutment surface.

21. A tool assembly comprising, in combination:
an insert,
a tool, and
a clamp configured to secure the insert to the tool;
the insert comprising:
opposite insert first and second side surfaces;
an insert plane parallel with and located midway between the insert side surfaces;
an insert peripheral surface connecting the insert side surfaces;
a first corner region located in an upper-rear portion of the cutting insert;
a second corner region located in an upper-front portion of the cutting insert;
a third corner region located in an lower-front portion of the cutting insert; and
a fourth corner region located in an lower-rear portion of the cutting insert;
the insert peripheral surface comprising:
a peripheral upper sub-surface extending from the first corner region to the second corner region;
a peripheral front sub-surface extending from the second corner region to the third corner region;
a peripheral lower sub-surface extending from the third corner region to the fourth corner region; and
a peripheral rear sub-surface extending from the fourth corner region to the first corner region, the peripheral front sub-surface extending lower than the peripheral rear sub-surface;
the first corner region comprising:
an insert upper abutment surface formed at the peripheral upper sub-surface and extending forward of the peripheral rear sub-surface; and
an insert rear abutment surface formed at the peripheral rear sub-surface and extending downward of the peripheral upper sub-surface;
the second corner region comprising:
a cutting edge connecting the insert side surfaces and being wider than adjacent portions of the peripheral upper and front sub-surfaces;
the third corner region comprising:
an insert first lower abutment surface formed at the peripheral lower sub-surface and extending rearward of the peripheral front sub-surface; and
an insert second lower abutment surface formed at the peripheral lower sub-surface and extending downward of the insert first lower abutment surface;
the tool comprising a tool corner having:
opposite tool first and second side surfaces;
a tool plane parallel with and located midway between the tool side surfaces;
a tool peripheral surface connecting the tool side surfaces; and
a rigid insert seat formed at an intersection of the tool peripheral surface and tool first and second side surfaces;

the tool peripheral surface at the tool corner further comprising:
   a tool upper sub-surface extending rearward of the insert seat; and
   a tool front sub-surface extending downward of the insert seat;
the insert seat, along the tool peripheral surface, comprising:
   a tool first lower abutment surface extending rearward of the tool front sub-surface;
   a tool second lower abutment surface extending downward of the tool first lower abutment surface;
   a tool rear abutment surface extending downward of the tool upper sub-surface; and
   a tool relief sub-surface extending between the tool second lower abutment surface and the tool rear abutment surface;
the clamp comprising:
   a shank; and
   a clamp head extending from the shank and comprising a clamp-insert abutment surface;

wherein, the insert is clamped to the tool by the following abutment configuration:
   the clamp-insert abutment surface abutting the insert upper abutment surface;
   the tool first lower abutment surface abutting the insert first lower abutment surface;
   the tool second lower abutment surface abutting the insert second lower abutment surface; and
   the tool rear abutment surface abutting the insert rear abutment surface;
wherein:
   the insert's fourth corner region comprises a rearwardly facing insert rear non-abutment surface which is located adjacent to and below the insert rear abutment surface;
   the tool relief sub-surface comprising a forwardly facing tool rear non-abutment surface which is located adjacent to and below the tool rear abutment surface;
   a rear relief gap separates the insert rear non-abutment surface and the tool rear non-abutment surface.

\* \* \* \* \*